(12) United States Patent
Tsuruda et al.

(10) Patent No.: US 10,844,580 B2
(45) Date of Patent: Nov. 24, 2020

(54) FAUCET APPARATUS

(71) Applicant: TOTO LTD., Kitakyushu (JP)

(72) Inventors: Yukito Tsuruda, Kitakyushu (JP); Kenji Kido, Kitakyushu (JP); Taichi Kusano, Kitakyushu (JP); Kazuki Kuroda, Kitakyushu (JP); Risa Watanabe, Kitakyushu (JP); Hideyuki Hasebe, Kitakyushu (JP); Yoshikazu Komatani, Kitakyushu (JP)

(73) Assignee: TOTO LTD., Kitakyushu (JP)

(*) Notice: Subject to any disclaimer, the term of this patent is extended or adjusted under 35 U.S.C. 154(b) by 42 days.

(21) Appl. No.: 16/226,238

(22) Filed: Dec. 19, 2018

(65) Prior Publication Data

US 2019/0194915 A1    Jun. 27, 2019

(30) Foreign Application Priority Data

Dec. 25, 2017  (JP) .................................. 2017-247728
Feb. 26, 2018  (JP) .................................. 2018-031847

(51) Int. Cl.
  *E03C 1/02*       (2006.01)
  *E03C 1/04*       (2006.01)
  (Continued)

(52) U.S. Cl.
  CPC ................ *E03C 1/025* (2013.01); *E03C 1/01* (2013.01); *E03C 1/04* (2013.01); *E03C 1/0401* (2013.01);
  (Continued)

(58) Field of Classification Search
  CPC . E03C 1/042; E03C 1/055; E03C 1/04; E03C 1/0408; E03C 2201/30; E03C 1/023; E03C 1/025; E03C 1/01; Y10T 137/87249; Y10T 137/87579; F16L 41/03; F16K 19/006
  See application file for complete search history.

(56) References Cited

U.S. PATENT DOCUMENTS 3,333,284 A * 8/1967 Symmons ................. E03C 1/06
                                                          4/670
5,205,313 A * 4/1993 Moretti .................... F16K 35/14
                                                          137/112

(Continued)

FOREIGN PATENT DOCUMENTS

| JP | 2002-89768 A | 3/2002 |
| JP | 2016-187533 A | 11/2016 |
| JP | 2017-31689 A | 2/2017 |

*Primary Examiner* — Atif H Chaudry
(74) *Attorney, Agent, or Firm* — BakerHostetler

(57) ABSTRACT

The faucet apparatus arranged inside a counter along a wall surface can be made thin in a height direction, and the counter can be made thin in the height direction. The faucet apparatus 1 includes a cold water supply pipe 6 supplying cold water, a hot water supply pipe 8 supplying hot water, a water temperature control function unit 10 capable of mixing hot water and cold water, and a flow path 14 extending from the water temperature control function unit. The flow path 14 forms a flow path crossing part 40, 240 crossing with at least any of at least the cold water supply pipe 6, the hot water supply pipe 8 or a downstream side flow path 220 on a downstream side of the outflow path while distinguishing respective inner flow paths from each other.

17 Claims, 16 Drawing Sheets

(51) Int. Cl.
*E03C 1/05* (2006.01)
*F16K 11/00* (2006.01)
*F16L 41/03* (2006.01)
*E03C 1/01* (2006.01)

(52) U.S. Cl.
CPC .......... *E03C 1/0403* (2013.01); *E03C 1/0404* (2013.01); *E03C 1/0408* (2013.01); *E03C 1/055* (2013.01); *F16K 19/006* (2013.01); *F16L 41/03* (2013.01); *E03C 2201/30* (2013.01); *Y10T 137/87249* (2015.04); *Y10T 137/87579* (2015.04)

(56) References Cited

U.S. PATENT DOCUMENTS

| | | | | |
|---|---|---|---|---|
| 5,884,652 A * | 3/1999 | Yeh | ............. | E03C 1/04 |
| | | | | 137/98 |
| 6,279,604 B1 * | 8/2001 | Korb | ............. | E03C 1/04 |
| | | | | 137/359 |
| 2008/0265566 A1 * | 10/2008 | Renfro | ............. | F16L 41/03 |
| | | | | 285/122.1 |
| 2011/0272041 A1 * | 11/2011 | Dharani | ............. | E03C 1/02 |
| | | | | 137/315.09 |
| 2018/0258621 A1 * | 9/2018 | Binay Kumar | ......... | E03C 1/023 |

\* cited by examiner

Prior Art

FAUCET APPARATUS

TECHNICAL FIELD

The prevent invention relates to a faucet apparatus, in particular, a faucet apparatus arranged inside a counter provided along a wall surface.

BACKGROUND ART

As shown in Patent Document 1 (JP-A-2017-31689), conventionally, a faucet apparatus arranged inside a counter provided along a wall surface is known. As shown in FIG. 11, such a faucet apparatus 101 comprises a cold water supply pipe 106 supplying cold water, a hot water supply pipe 108 supplying hot water, a water temperature control function unit 110 having a function capable of mixing hot water and cold water, an outflow path 114 extending from the water temperature control function unit 110, a flow rate control unit 116 having a function for controlling a flow rate of water, a touch operation unit 126 for a tap, and a touch operation unit 128 for a shower. In this manner, in the conventional faucet apparatus arranged inside a counter, the cold water supply pipe 106, the hot water supply pipe 108, and the outflow path 114 are arranged at three-dimensionally offset locations from each other in a height direction so as to bypass each other, and then form flow paths between the respective function units.

Also, as shown in FIG. 18, such a faucet apparatus 101 further comprises a tap water spout part 130 for spouting water downward, and a second flow path 132 extending from the touch operation unit 126 for the tap to the tap water spout part 130. In the faucet apparatus 101 arranged inside the counter, the first flow path 114 and the second flow path 132 are arranged at three-dimensionally offset locations from each other in the height direction so as to bypass each other, and then form flow paths between the respective function units.

SUMMARY OF THE INVENTION

Technical Problem

Recently, there is a demand for making the faucet apparatus 101 arranged in the counter as shown in Patent Document 1 thin in the height direction.

However, in the faucet apparatus described in Patent Document 1, when the faucet apparatus 101 is made thin, there is a problem that the cold water supply pipe 106, the hot water supply pipe 108, and the outflow path 114 cannot be arranged at offset locations from each other in the height direction, and cross with each other, and therefore the faucet apparatus cannot be formed thin in the height direction.

Furthermore, in the water temperature control function unit 110, both of the cold water supply pipe 106 and the hot water supply pipe 108 need to be connected to each other. Therefore, when the faucet apparatus 101 is made thin, there is a problem that the outflow path 114 for flowing the water whose temperature is controlled by the water temperature control function unit 110 crosses with the cold water supply pipe 106 or the hot water supply pipe 108 around the water temperature control function unit 110.

Also, there is a demand for forming a counter for housing the faucet apparatus 101 as shown in Patent Document 1 into a box shape, and making its height small. Then, the inventors of the present invention considered that the first flow path 114 and the second flow path 132 were arranged so as not to be offset from each other in the height direction, to make the faucet apparatus 101 thin.

However, when the first flow path 114 and the second flow path 132 are arranged so as not to be offset from each other in the height direction, there is a problem that a place where a tap water spout part 130 for spouting water downward can be provided at a downstream end of the second flow path 132 is limited. When the tap water spout part 130 is provided at a free position, there is a need for arranging the first flow path 114 and the second flow path 132 at offset locations from each other in the height direction so as to bypass each other, and therefore the height of the counter cannot be made thin. Such a problem is caused.

Thus, the present invention is made for solving problems and concerns of a prior art, and an object of the present invention is to provide a faucet apparatus that can make a faucet apparatus arranged inside a counter along a wall surface thin in a height direction.

Solution to Problem

To achieve the above-mentioned object, the present invention relates to a faucet apparatus arranged inside a counter provided along a wall surface comprises a cold water supply path for supplying water from a water supply source, a hot water supply path for supplying hot water from a hot water supply source, a water temperature control function unit connected to the cold water supply path and the hot water supply path and capable of mixing hot water and cold water, and an outflow path extending from the water temperature control function unit. A outflow path crossing part for crossing at least any of the cold water supply path, the hot water supply path or a downstream outflow path on a downstream side of the outflow path with respective inner flow paths while distinguishing them from each other is formed in the outflow path.

According to the present invention, preferably the faucet apparatus arranged inside the counter provided along the wall surface comprises a cold water supply path for supplying cold water from a water supply source, a hot water supply path for supplying hot water from a hot water supply source, and a water temperature control function unit connected to the cold water supply path and the hot water supply path and capable of mixing hot water and cold water. The flow path forms an outflow path for flowing temperature-controlled water flowing from the water temperature control function unit, and the outflow path forms an flow path crossing part for crossing at least any of the cold water supply path or the hot water supply path arranged at such a height that it is crossed with the outflow path with the respective inner flow paths while distinguishing them from each other.

In the faucet apparatus arranged inside the counter provided along the wall surface according to the present invention constituted in such a manner, the outflow path can cross with at least any of the cold water supply path or the hot water supply path arranged at a height that it is crossed with the outflow paths while distinguishing the respective inner flow paths from each other. Thereby, a space in a height direction in a faucet apparatus required for crossing any of the outflow path, the cold water supply path or the hot water path with each other with varied height can be saved. Thus, according to the present invention, the faucet apparatus arranged inside the counter provided along the wall surface can be made thin in the height direction, and the counter can be made thin in the height direction.

According to the present invention, preferably, the flow path crossing part is formed by inserting a second member forming an inside flow path distinguished from its own outside in a first member forming the outflow path.

According to the present invention constituted in such a manner, the flow path crossing part of the outflow path is formed by inserting the second member forming the inside flow path distinguished from its own outside in the first member forming the outflow path. Accordingly, regarding the flow path crossing part of the outflow path, the increase of the thickness by molding by casting can be prevented, and the flow path crossing part is molded by resin, so as to be formed at small thickness. Thus, according to the present invention, the faucet apparatus arranged inside the counter can be made thin in the height direction. Also, the flow path crossing part of the outflow path can be formed of resin comparatively simply.

According to the present invention, preferably, the flow path crossing part distinguishes the outflow path by the first member and the second member between a first seal member and a second seal member for sealing a contact part of the first member and the second member, and is distinguished from the inside flow path in the second member.

According to the present invention constituted in such a manner, the flow path crossing part defines the outflow path by the first member and the second member between the first seal member and the second seal member for sealing the contact part of the first member and the second member, and is distinguished from the flow path in the second member. Thereby, the flow path crossing part can be formed comparatively simply by combination of the first member and the second member, and the outflow path at the flow path crossing part can cross with at least any of the cold water supply path or the hot water supply path arranged at such a height that it is crossed with the outflow path while distinguishing the respective inner flow paths from each other.

According to the present invention, preferably, the second member is formed into a cylindrical shape in at least a portion for defining the outflow path on its outside.

According to the present invention constituted in such a manner, the second member is formed into a cylindrical shape at a portion for defining at least the outflow path outside. Thereby, even when a stress is applied to the second member, by temperature differences between the hot water or the cold water passing through the second member and the temperature-controlled water in the outflow path, the stress can be applied to the second member comparatively equally, so as to restrain breakage of the second member. In this manner, the second member is formed into a cylindrical shape. Therefore, the second member prevent causing a phenomenon that the stress is concentrated on the corner and the second member is broken by forming the second member into a deformed pipeline having a corner.

According to the present invention, preferably, the second member comprises a first seal support member for supporting the first seal member on a tip side inserted in a tip of the first member, and a second seal support member for supporting the second seal member on a rear end side inserted after inserting the first seal support member. The first seal support member is formed so that its outside diameter is made smaller than the outside diameter of the second seal support member.

According to the present invention constituted in such a manner, the first seal support member on the tip side of the second member inserted in advance is formed so that its outside diameter is made smaller than that of the second seal support member on the rear end side, so that an assembling efficiency at the time of assembly in which the second member is inserted together with the first seal member and the second seal member can be improved. Also, the first seal support member for supporting the first seal member is formed so that its outside diameter is smaller than that of the second seal support member. Thereby, when the first seal member supported by the first seal support member is inserted in the first member, it can be restrained that the first seal member is unintentionally contact with the first member for causing breakage or torsion, the first seal member is broken or twisted, and the first seal member is not provided at a proper state.

According to the present invention, preferably, the second member is formed of resin.

In the present invention constituted in such a constitution, the second member is formed of resin with lower heat conductivity than metal, and therefore, heat exchange between hot water or cold water passing through the second member and the temperature-controlled water in the outflow path can be restrained. The second member is formed of resin, and therefore, the faucet apparatus can be manufactured at low costs. Furthermore, the weight of the faucet apparatus can be made lighter, so as to improve workability and reduce transportation costs.

According to the present invention, preferably, the apparatus further comprises a flow rate control function unit for controlling the flow rate of the temperature-controlled water on a downstream side of the water temperature control function unit, and the flow path crossing part is provided on a further upper stream side than the flow rate control function unit.

According to the present invention constituted in such a manner, the flow path crossing part is provided in a vicinity area of the water temperature control function unit on the upper stream side than the flow rate control function unit. Thereby, in an area where the outflow path easily crosses with the other flow path, the outflow path can cross at least any of the cold water supply path or the hot water supply path arranged at such a height that it crosses with the outflow path while distinguishing the respective inner flow paths from each other, so as to improve arrangement efficiency of the flow path. Thereby, a space in the height direction in the faucet apparatus required so that any of the outflow path, the cold water supply path or the hot water supply path can cross with each other while changing the height so as to bypass with each other, can be more efficiently saved. Thus, according to the present invention, the faucet apparatus arranged inside the counter provided along the wall surface can be made thinner in the height direction, and the counter can be made thinner in the height direction.

According to the present invention, preferably, the faucet apparatus arranged inside the counter provided along the wall surface comprises a cold water supply path for supplying cold water from a water supply source, a hot water supply path for supplying hot water from a hot water supply source, a water temperature control function unit connected to the cold water supply path and the hot water supply path and capable of mixing hot water and cold water, an spout unit for spouting temperature-controlled water flown from the water temperature control function unit, and an water spout and stop control unit for switching spout and stop of the temperature-controlled water from the spout unit. The flow path forms a first flow path extending from the water temperature control function unit to the water spout and stop control unit, the downstream side flow path on the downstream side of the flow path forms a second flow path extending from the water spout and stop control unit to the spout unit, and the first flow path and the second flow path arranged at such a height that it crosses with the first flow path form a flow path crossing part while distinguishing respective inner flow paths from each other.

According to the present invention constituted in such a manner, at the flow path crossing part of the faucet apparatus arranged inside the counter provided along the wall surface, the first flow path and the second flow path arranged at such a height that it crosses with the first flow path can cross while distinguishing respective inner flow paths from each other. Thereby, a space in the height direction in the faucet apparatus required for achieving that the first flow path and the second flow path cross with each other while changing the height of any one of them so as to bypass each other can be saved. Thus, according to the present invention, the faucet apparatus arranged inside the counter provided along the wall surface can be made thin in the height direction, and the counter can be made thin in the height direction.

According to the present invention, preferably, the flow path crossing part is formed by inserting the first member forming the inside first flow path distinguished from its own outside into the second member forming the second flow path.

According to the present invention constituted in such a manner, the flow path crossing part is formed by inserting the first member forming the inside first flow path distinguished from its own outside in the second member forming the second flow path. Thus, the flow path crossing part is molded of resin so as to be formed at small thickness and the increase of thickness by molding of a casting can be prevented, Thus, according to the present invention, the faucet apparatus arranged inside the counter can be made thin in the height direction. Also, the flow path crossing part can be formed of resin comparatively simply.

According to the present invention, preferably, the flow path crossing part defines the second flow path by the first member and the second member between a first seal member and a second seal member for sealing a contact part between the first member and the second member, and distinguishes it from the first flow path in the first member.

According to the present invention constituted in such a manner, the flow path crossing part defines a second flow path by the first member and the second member between the first seal member and the second seal member for sealing the contact part between the first member and the second member, and distinguishes it from the first flow path in the first member. Thereby, the flow path crossing part can be formed comparatively simply by combination of the first member and the second member, and the first flow path at the flow path crossing part can cross with the second flow path arranged at such a height that it crosses with the first flow path, while distinguishing the respective inner flow paths from each other.

According to the present invention, preferably, the first member comprises a first seal support member for supporting the first seal member on a tip side inserted in the second member in advance, and a second seal support member for supporting the second seal member on a rear end side inserted after inserting the first seal support member. The first seal support member is formed so that its outside diameter is made smaller than that of the second seal support member.

According to the present invention constituted in such a manner, the first seal support member on the tip side of the first member inserted in advance is formed so that the outside diameter is made smaller than that of the second seal support member on the rear end side, so that an assembling efficiency at the time of assembly for inserting the first member in the second member while accompanying the first seal member and the second member can be improved. The first seal support member for supporting the first seal member is formed so that its outside diameter is made smaller than that of the second seal support member. Thereby, when the first seal member supported by the first seal support member is inserted in the second member, it can be restrained that the first seal member is unintentionally contact with the second member for causing breakage or torsion, the first seal member is broken or twisted, and the first seal member is not provided at a proper state.

According to the present invention, preferably, the first member is formed into a cylindrical shape at a portion for defining at least the second flow path outside.

According to the present invention constituted in such a manner, the first member is formed into a cylindrical shape in at least a portion distinguishing the second flow path from outside. Thereby, due to a pressure difference between the temperature-controlled water of the first flow path in the first member and the temperature-controlled water of the second flow path on a downstream side of the water spout and stop control unit, even when a stress by water pressure is applied to the first member, a stress is applied to the first member comparatively equally, so that breakage of the first member can be restrained. In this manner, the first member is formed into a cylindrical shape. Therefore causing a phenomenon can be prevented that the stress is concentrated at a corner and the first member is broken by forming the first member into a deformed pipeline having a corner.

According to the present invention, preferably, the first member is formed of resin.

According to the present invention constituted in such a manner, the first member is formed of resin, and therefore, the faucet apparatus can be manufactured at lower costs.

According to the present invention, preferably, the flow path crossing part is formed by arranging the flow path inside the second flow path.

According to the present invention constituted in such a manner, even when a crossing portion of the first flow path and the second flow path is broken at the flow path crossing part, the water flows to the water spout part via the second flow path from the first flow path that is a primary side flow path. Thus, when the crossing portion at the flow path crossing part is broken, the water can flow from the water spout part as failure of water stop, so as to restrain the water from flowing out in the faucet apparatus other than the second flow path as leaked water.

According to the present invention, preferably, the second member comprises a lateral flow path extending in a lateral direction, and a vertical flow path extending in a downward direction, and the flow path crossing part forms a bent part of the second flow path bent from the lateral flow path of the second member to the vertical flow path.

According to the present invention constituted in such a manner, the flow path crossing part can form the bent part of the second flow path, and therefore, a need for providing a curve pipeline for curving the flow path from the lateral direction toward the downward direction other than the flow path crossing part. Thus, compared to a case where a pressure loss of an additional curve pipeline is received in addition to a pressure loss of water passing through the flow path crossing part, the second flow path can be curved at the flow path crossing part, and it is possible to reduce the pressure loss of the second flow path.

According to the present invention, preferably, the water spout part is arranged between the water temperature control function unit and the water spout and stop control unit, in a top view.

According to the present invention constituted in such a manner, the flow path crossing part is formed on the faucet apparatus, so that the water spout part can be arranged between the water temperature control function unit and the water spout and stop control unit in a top view, in a thin counter. Thus, the water spout part can be provided in a comparatively center area of the faucet apparatus between the water temperature control function unit and the water spout and stop control unit, and a user can easily arrange a basin under the water spout part while not interfering with structures such as right and left wall surfaces and a bath tub, and it is possible to improve user's convenience of the water spout part.

According to the present invention, preferably, the apparatus further comprises a cover case formed on an upper face of the counter, and the water spout part is arranged in a further front side than a center portion of an upper face of the cover case in a top view.

According to the present invention constituted in such a manner, the flow path crossing part is formed on the faucet apparatus, so that the water spout part can be arranged in further front side than a center of a top plate of the cover case in a top view in the thin counter. Thus, the basin arranged under the water spout part can be restrained from interfering with wall surfaces and the like on which the faucet apparatus is provided. Furthermore, the user can arrange the basin in further a front side than the center of the top plate of the cover case, and it is possible to improve user's convenience of the water spout part.

Advantageous Effects of Invention

In the faucet apparatus according to the present invention, the faucet apparatus arranged inside the counter provided along the wall surface can be made thin in a height direction, and the counter can be made thinner in a height direction.

DESCRIPTION OF EMBODIMENTS

Figure 1:
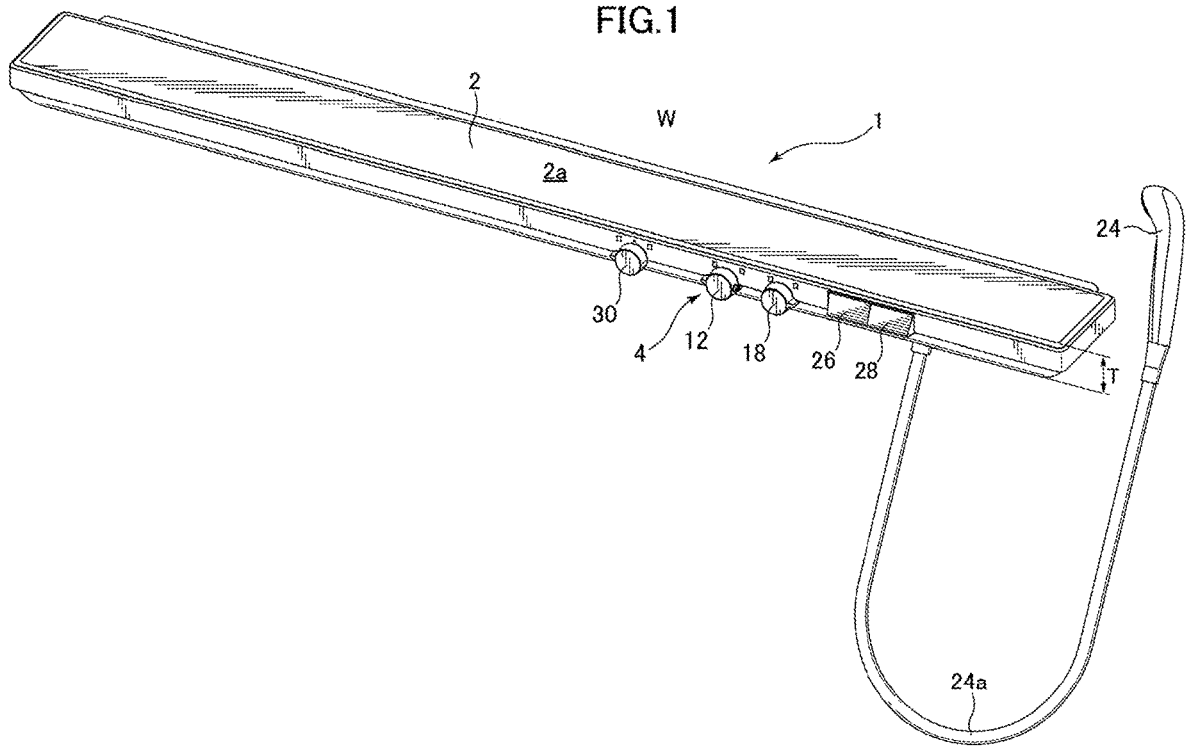
FIG. 1 is a perspective view of a faucet apparatus in a first embodiment of the present invention.
Figure 2:
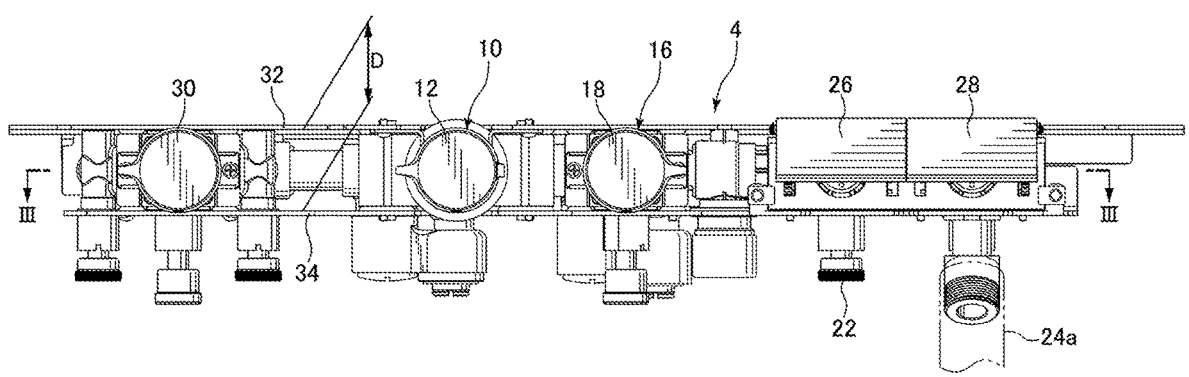
FIG. 2 is a front view of a faucet apparatus main body of the faucet apparatus in the first embodiment of the present invention.
Figure 3:
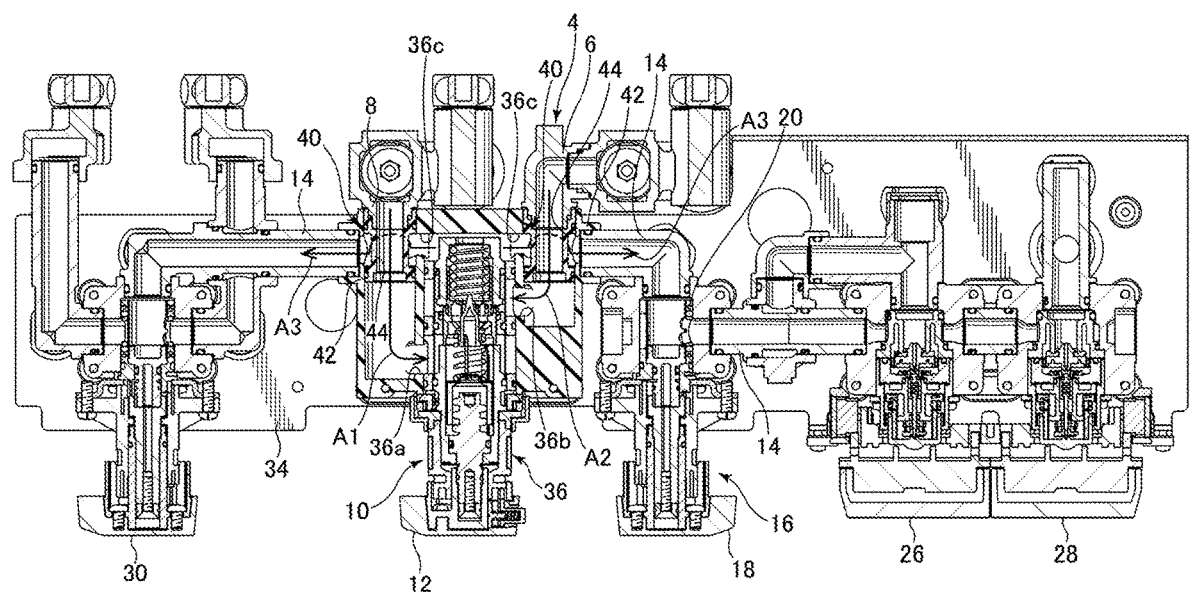
FIG. 3 is a cross section view of the faucet apparatus seen along a line III-III of FIG. 2.

First, a faucet apparatus in a first embodiment of the present invention will be explained with reference to FIGS. 1 to 3. FIG. 1 is a perspective view of the faucet apparatus in the first embodiment of the present invention. FIG. 2 is a front view of a faucet apparatus main body of the faucet apparatus in the first embodiment of the present invention. FIG. 3 is a cross section view of the faucet apparatus seen along a III-III line of FIG. 2.

A faucet apparatus 1 is a counter-integrated type faucet apparatus arranged inside a counter along a wall surface W of plumbing facilities, for example, a bath room, a kitchen, a sink and the like. A cover case 2 constituted the counter is mounted on the wall surface W, and an upper face 2a is formed flat, and can be used as a counter on which articles can be located. The cover case 2 is arranged to cover outside of the faucet apparatus 1, and a faucet apparatus main body 4 is built in the cover case 2. The cover case 2 is formed into a box-shape.

As shown in FIGS. 2 and 3, the faucet apparatus main body 4 of the faucet apparatus 1 comprises a cold water supply pipe 6 that is a water supply path for supplying water from a water supply source such as a tap, a hot water supply pipe 8 that is a hot water supply path for supplying hot water from the water supply source, a water temperature control function unit 10 connected to the cold water supply pipe 6 and the hot water supply pipe 8 and having a function capable of mixing hot water and cold water, a water temperature control handle 12 for performing a temperature control operation by a water temperature control function unit 10, an outflow path 14 in which temperature-controlled water being temperature-controlled water flowing from the water temperature control function unit 10 flows, a flow rate control unit 16 that is a flow rate control function unit having a function for controlling a flow rate of the temperature-controlled water flown from the outflow path 14, and a flow control handle 18 for performing the flow rate control operation by the flow rate control unit 16.

In the present embodiment, the term, "water" is used to include cold water in a condition that it is supplied from the water supply source, moderate temperature water obtained by mixing hot water and cold water, hot water in a condition that it is supplied from the hot water supply source, and the like.

The hot water supply pipe 8 extends on a back face of the faucet apparatus main body 4 from the wall surface W, and extends to inside from the back face of the faucet apparatus main body 4. The cold water supply pipe 6 extends to the back face of the faucet apparatus main body 4 from the wall surface W, and extends to inside from the back face of the faucet apparatus main body 4.

The water temperature control handle 12 has a structure capable of controlling temperature of the temperature-controlled water flowing from the outflow path 14 by a function of the water temperature control function unit 10 by rotating the water temperature control handle 12. The term, "temperature-controlled water" includes water whose temperature is not controlled by the water temperature control function unit 10 and that is supplied from the cold water supply pipe 6, and hot water whose temperature is not controlled by the water temperature control function unit 10 and that is supplied from the hot water supply pipe 8, as well as water obtained by mixing hot water and cold water by the water temperature control function unit 10.

A flow control handle 18 has a structure capable of controlling a flow rate of spout water due to a function of a flow rate control unit 16 by rotating the flow control handle 18.

The flow rate control unit 16 has a function for rotating a rotation valve 20 by user's operating the flow control handle 18 to rotate, for controlling a flow rate of the temperature-controlled water, and for controlling a flow rate of water spouted from a tap 22 and/or a showerhead 24 on a downstream side. The flow rate control unit 16 is arranged on the downstream side of the water temperature control function unit 10, and connected to the outflow path 14. On the downstream side of the flow rate control unit 16, the outflow path 14 in which the water whose flow rate is controlled flows further extends.

The faucet apparatus main body 4 further comprises a tap 22 opened downward, a showerhead 24 connected via a shower hose 24a, a touch operation unit 26 for a tap for operating start and end of the water spouted from the tap 22, a touch operation unit 28 for a shower for operating start and end of the water spouted from the showerhead 24, and an overhead shower switch operation unit 30 for operating start and end of the water spout from an overhead shower (not shown).

The touch operation unit 26 for the tap and the touch operation unit 28 for the shower are connected to the outflow path 14 on the downstream side of the flow rate control unit 16, and the water supplied from the flow rate control unit 16 is spouted from the tap 22 and/or the showerhead 24.

The outflow path 14 is connected to the overhead shower switch operation unit 30.

The faucet apparatus main body 4 further comprises an upper plate 32 horizontally extending on an upper side of the water temperature control function unit 10, the flow rate control unit 16, the touch operation unit 26 for the tap and the touch operation unit 28 for the shower, and a lower plate 34 horizontally extending on an upper side of the water temperature control function unit 10, the flow rate control unit 16, the touch operation unit 26 for the tap and the touch operation unit 28 for the shower. The upper plate 32 and the lower plate 34 are formed of metallic plates.

In the faucet apparatus main body 4, the water temperature control function unit 10, the flow rate control unit 16, the touch operation unit 26 for the tap, and the touch operation unit 28 for the shower are respectively formed into a box-shape, and modularized as function units performing respective functions. The respective modularized function units are laterally aligned in the counter-type faucet apparatus 1, for making the faucet apparatus main body 4 thin and improve an appearance.

The faucet apparatus main body 4 is fixed to sandwich the respective modularized function units between the upper plate 32 and the lower plate 34, and the arrangement of the respective function units can be switched or changed for each function unit. In the faucet apparatus main body 4, the respective function units, the cold water supply pipe 6, the hot water supply pipe 8 and the outflow path 14 are arranged between the upper plate 32 and the lower plate 34. By restraining the change of the flow path of the cold water supply pipe 6, the hot water supply pipe 8 and the outflow path 14 in a height direction, it is possible to reduce an interval D between the upper plate 32 and the lower plate 34 (see FIG. 2), and it is also decrease thickness T of the faucet apparatus main body 4 (thickness between an upper face 2a and a lower face of a cover case 2 (counter) covering immediately outside of the faucet apparatus main body 4) (see FIG. 1) in the height direction.

Figure 4:
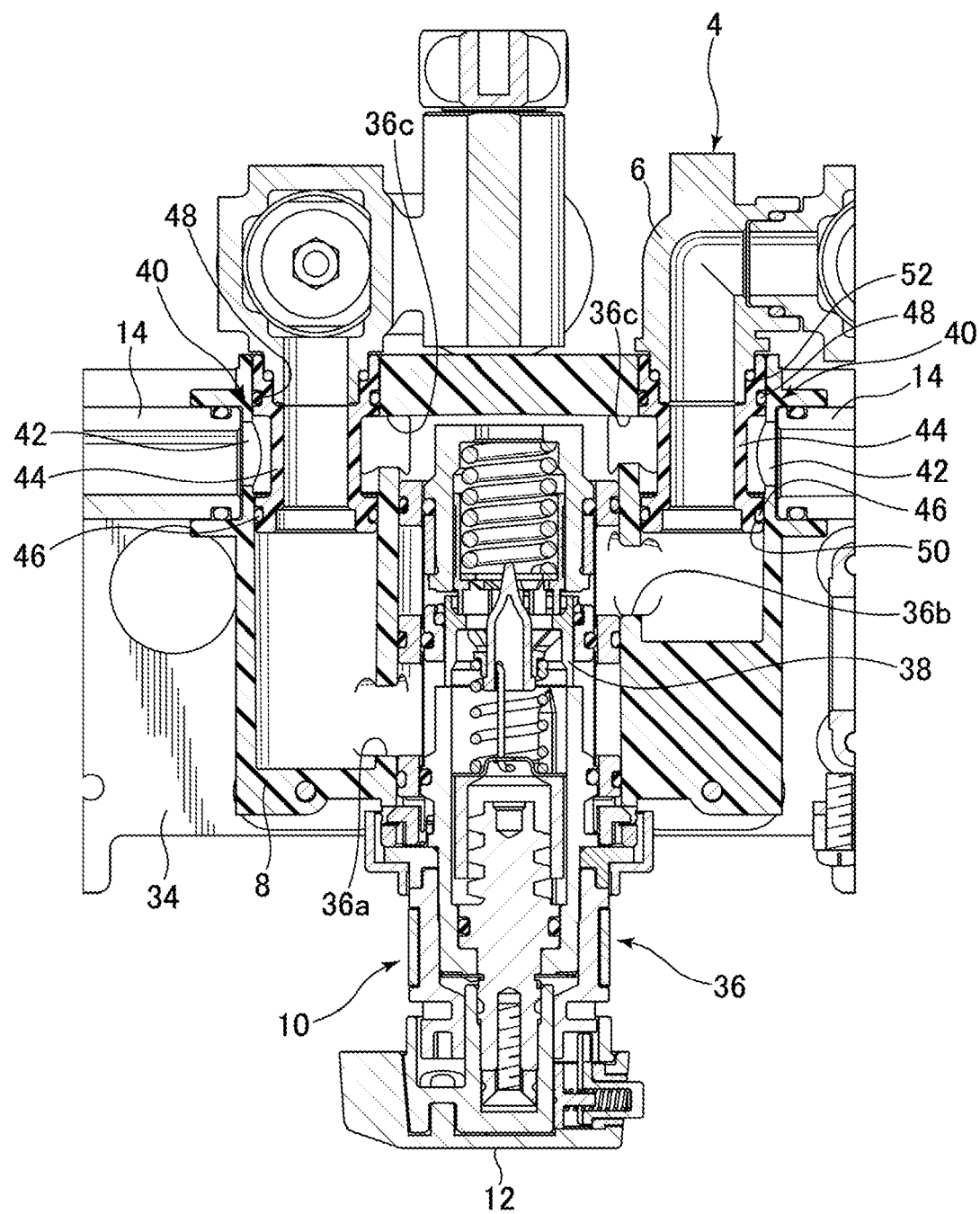
FIG. 4 is a partially enlarged cross section view for indicating a neighboring region of a water temperature control function unit of the faucet apparatus seen along the line III-III of FIG. 2.

Then, the water temperature control function unit 10 will be explained with reference to FIGS. 3 and 4. FIG. 4 is a partially enlarged cross section view for indicating a neighboring region of a water temperature control function unit of the faucet apparatus seen along the line III-III of FIG. 2.

As shown in FIGS. 3 and 4, the water temperature control function unit 10 comprises a water temperature control function unit main body 36 having a function for mixing hot water and cold water, a hot water side flow inlet 36a formed on a side face on a front side and one side of the water temperature control function unit main body 36, a cold water side flow inlet 36b formed on a side face on a front side and the other side of the water temperature control function unit main body 36, and a flow outlet 36c formed on a rear side of the water temperature control function unit main body 36, and flowing the temperature-controlled water from the water temperature control function unit main body 36.

The water temperature control function unit main body 36 is arranged almost horizontally from a rear side to a front side of the faucet apparatus main body 4, and a water temperature control handle 12 is mounted to a front end. The water temperature control function unit main body 36 has a function for sliding a cylindrical water temperature control main valve body 38 arranged inside in an axial line direction by user's operation of the water temperature control handle 12, so as to adjust a mixing proportion of hot water and cold water.

The hot water side flow inlet 36a is connected to the hot water supply pipe 8. As shown by an arrow A1 (see FIGS. 3 and 7), the hot water is supplied to the water temperature control function unit main body 36 through the hot water side flow inlet 36a from the hot water supply pipe 8. The cold water side flow inlet 36b is connected to the cold water supply pipe 6. As shown by an arrow A2 (see FIGS. 3 and 7), the cold water is supplied to the water temperature control function unit main body 36 from the cold water supply pipe 6 through the cold water side flow inlet 36b. The hot water supply pipe 8 and the cold water supply pipe 6 are arranged on the almost same plane and connected to the water temperature control function unit main body 36. The flow outlets 36c are formed on both side faces of the water temperature control function unit main body 36, and are respectively connected to the outflow path 14 extending in a lateral direction. Also, the flow outlets 36c are formed on both side faces of the water temperature control function unit main body 36, and may be formed on only one side face.

Then, the flow path crossing part will be explained with reference to FIGS. 4 to 10.

Figure 5:
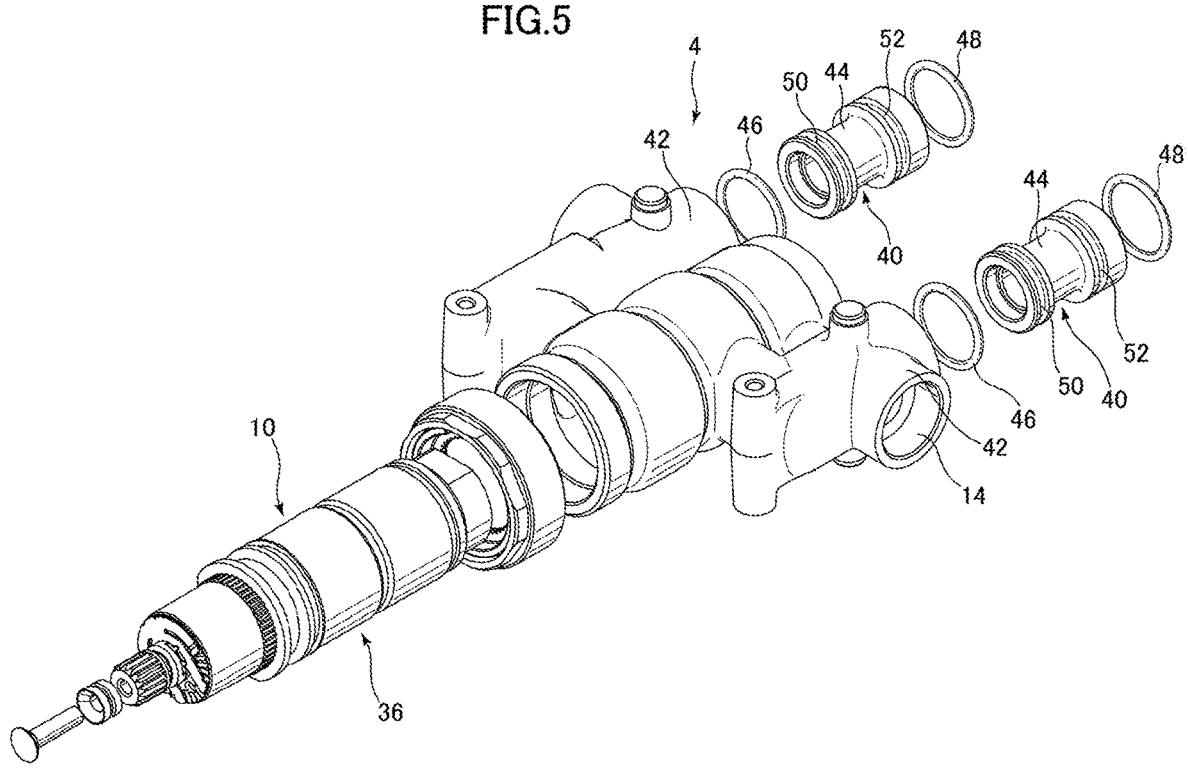
FIG. 5 is an exploded perspective view of a flow path crossing part of the faucet apparatus in the first embodiment of the present invention.
Figure 6:
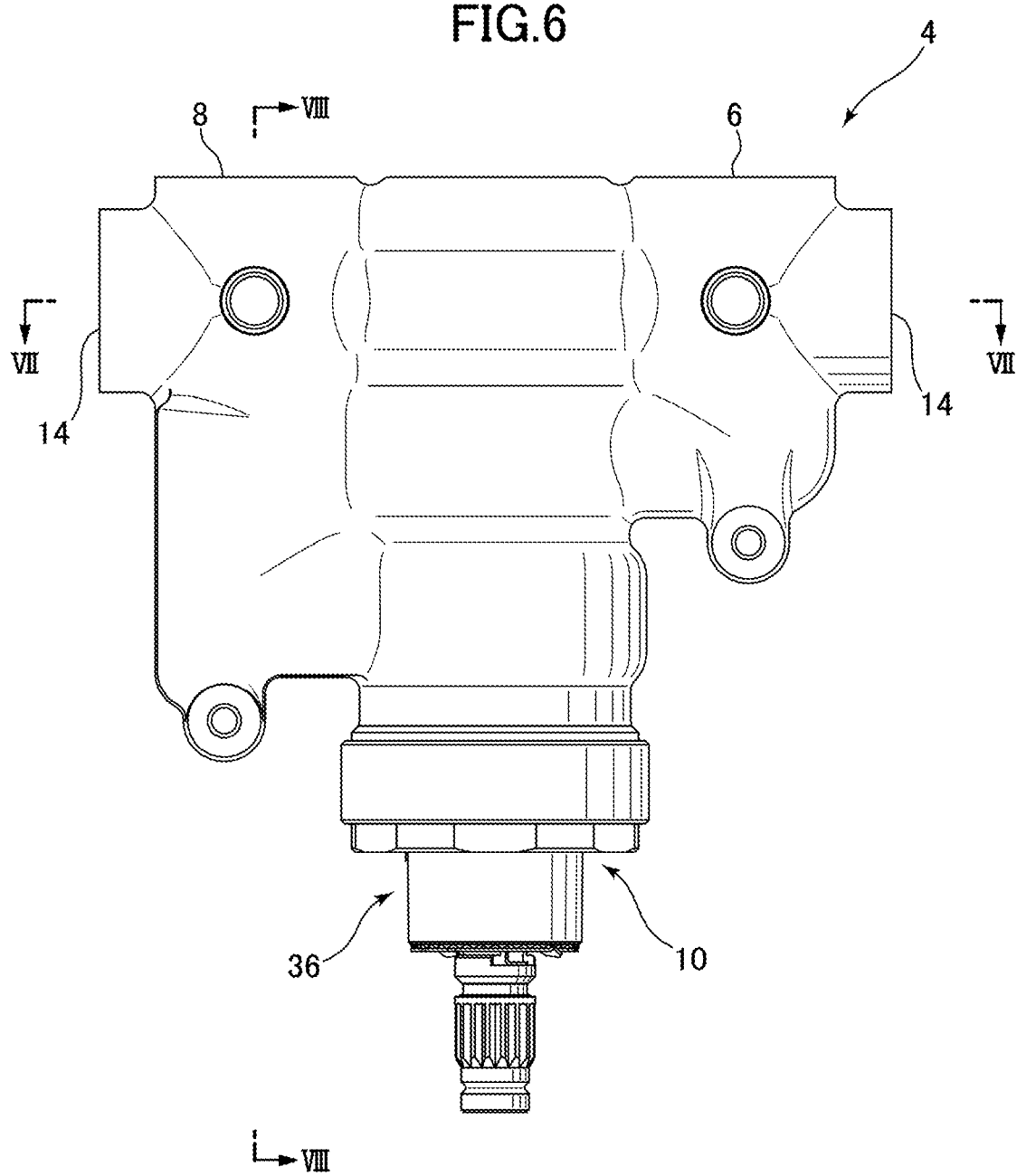
FIG. 6 is a top view of the flow path crossing part of the faucet apparatus in the first embodiment of the present invention.
Figure 7:
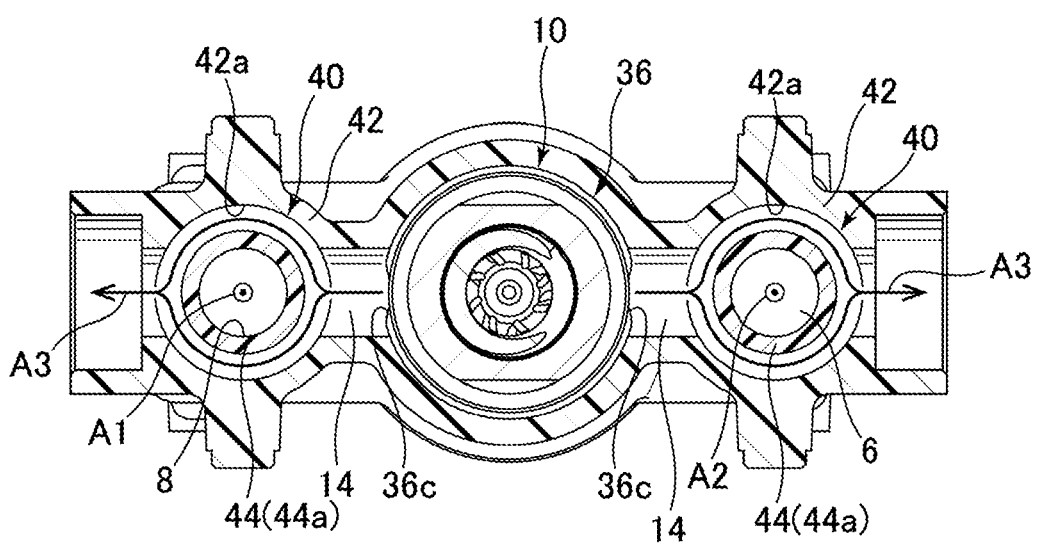
FIG. 7 is a cross section view of the flow path crossing part seen along a line VII-VII of FIG. 6.
Figure 8:
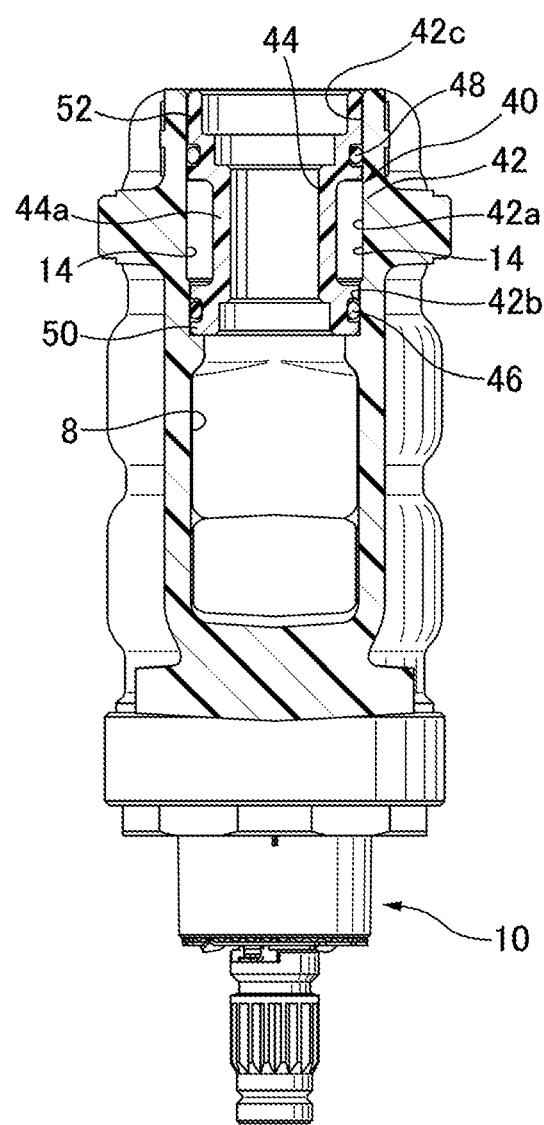
FIG. 8 is a cross section view of the flow path crossing part seen along a line VIII-VIII of FIG. 6.
Figure 9:
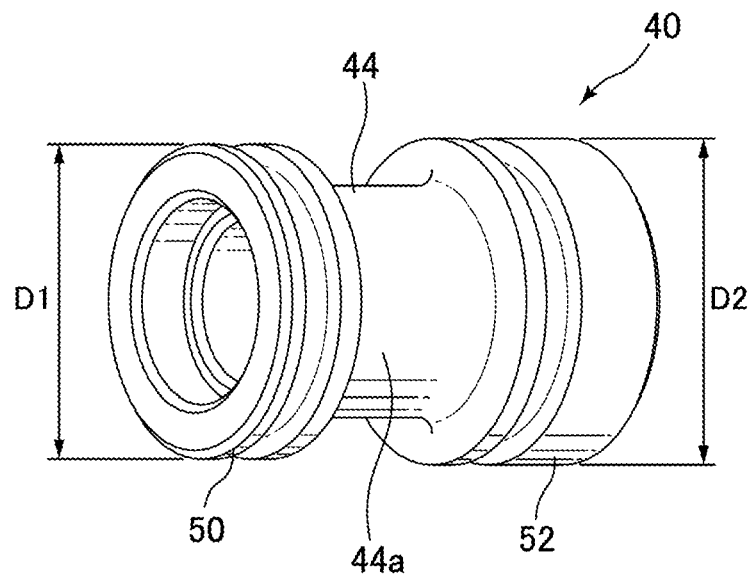
FIG. 9 is a perspective view of a second member of the flow path crossing part of the faucet apparatus in the first embodiment of the present invention.
Figure 10:
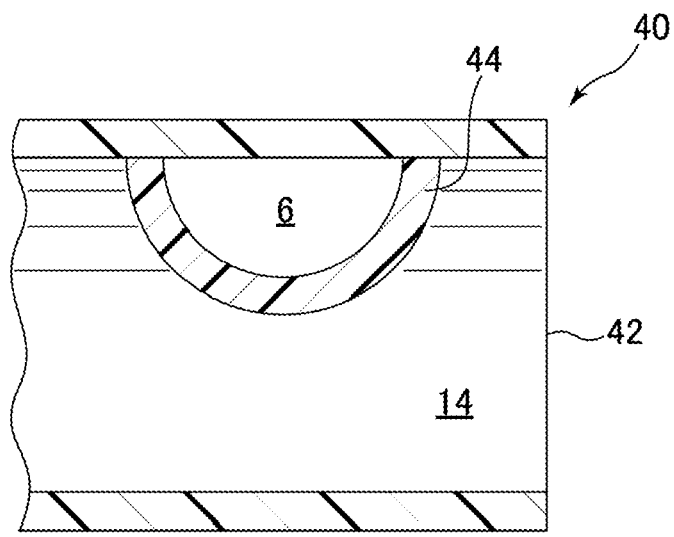
FIG. 10 is a diagram illustrating a variation example of a constitution of the flow path crossing part of the faucet apparatus in the first embodiment of the present invention.
Figure 11:
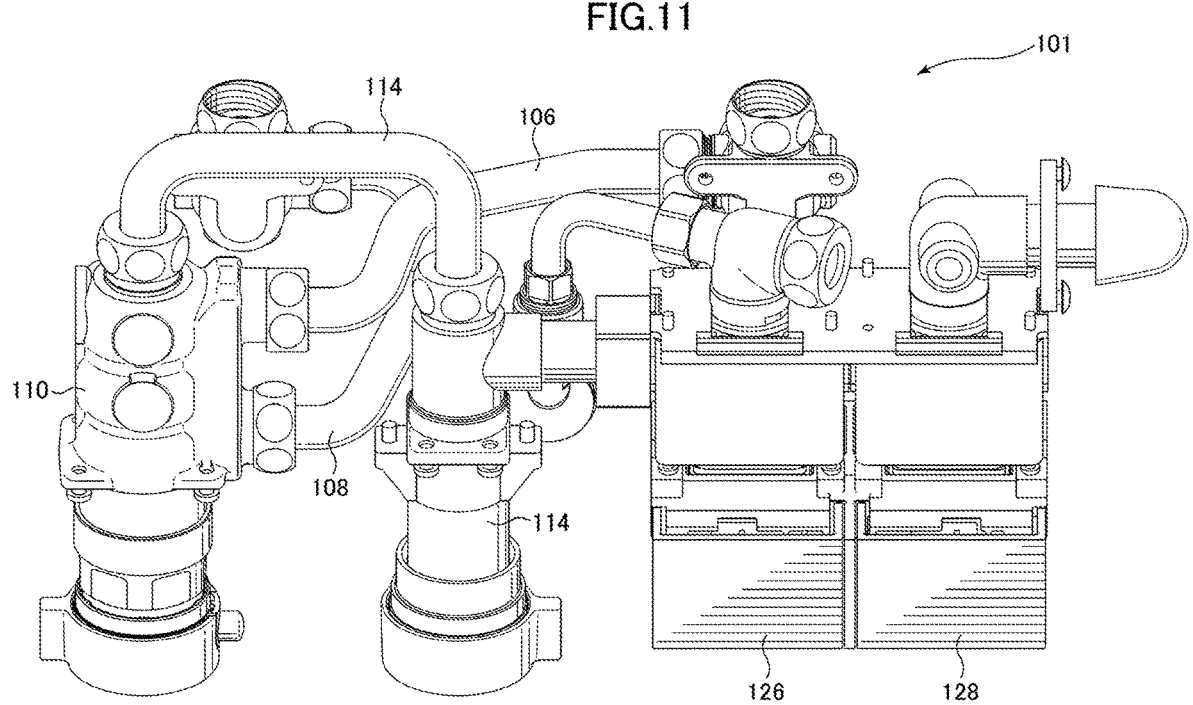
FIG. 11 is a perspective view illustrating arrangement of a cold water supply pipe, a hot water supply pipe and an outflow path of a conventional faucet apparatus.

FIG. 5 is an exploded perspective view of a flow path crossing part of the faucet apparatus in the first embodiment of the present invention. FIG. 6 is a top view of the flow path crossing part of the faucet apparatus in the first embodiment of the present invention. FIG. 7 is a cross section view of the flow path crossing part seen along a line VII-VII of FIG. 6. FIG. 8 is a cross section view of the flow path crossing part seen along a line VIII-VIII of FIG. 6. FIG. 9 is a perspective view of a second member of the flow path crossing part of the faucet apparatus in the first embodiment of the present invention. FIG. 10 is a diagram illustrating a variation example of a constitution of the flow path crossing part of the faucet apparatus in the first embodiment of the present invention.

The outflow path 14 forms a flow path crossing part 40 crossing with any of the cold water supply pipe 6 or the hot water supply pipe 8 which are arranged at a height that any of pipe 6 or pipe 8 cross with the outflow path 14 while distinguishing the respective inner flow paths from each other. The cold water supply pipe 6, the hot water supply pipe 8 and the outflow path 14 are arranged between the upper plate 32 and the lower plate 34 at almost the same height, and so they are arranged at such a height that they cross with each other. The cold water supply pipe 6, the hot water supply pipe 8 and the outflow path 14 are arranged on the same plane, but may be arranged so that respective center axes do not cross with each other and are offset from each other in a height direction at such a degree that ends of respective pipes and path cross with each other. As shown by an arrow A3 (see FIGS. 3 and 7), the water flown from the flow outlet 36c flows through the outflow path 14.

The flow path crossing part 40 is provided on a lower stream side than the water temperature control function unit 10 and on an upper stream side than the flow rate control unit 16. The flow path crossing part 40 is provided in a vicinity area of the water temperature control function unit 10 on an upper stream side than the flow rate control unit 16, so that the outflow path 14, the cold water supply pipe 6 and/or the hot water supply pipe 8 can be efficiently arranged without bypassing, so as to further improve arrangement efficiency of the flow path. Also, even when the flow path crossing part 40 is provided on a lower stream side than the flow rate control unit 16, the arrangement efficiency of the flow path can be improved. The flow path crossing part 40 may be formed by the outflow path 14, and a flow path other than the cold water supply pipe 6 and the hot water supply pipe 8.

The flow path crossing part 40 is formed by inserting a second member 44 forming an inner flow path distinguished from its own outside in a first member 42 forming the outflow path 14. The flow path crossing part 40 defines the outflow path 14 by the first member 42 and the second member 44 between a first seal member 46 and a second seal member 48 for sealing a contact part of the first member 42 and the second member 44, and distinguishes it from a flow path in the second member 44. The flow path in the second member 44 is, for example, a flow path forming one part of the cold water supply pipe 6 or the hot water supply pipe 8.

The first member 42 is formed so that a rear part of the water temperature control function unit main body 36 is arranged inside, a columnar outflow path 14 is formed further inside, and a columnar inner space 42a in which the second member 44 can be inserted crosses with the outflow path 14. The first member 42 is formed of resin. Furthermore, the first member 42 may be molded by casting.

The second member 44 is a cylindrical member. The second member 44 is formed into a cylindrical shape at an intermediate part 44a for defining at least the outflow path 14 outside. The second member 44 comprises a first seal support member 50 supporting a first seal member 46 on a tip side inserted in the first member 42 in advance, and a second seal support member 52 supporting the second seal member 48 on a rear end side inserted after inserting the first seal support member 50. An outside diameter D1 of the first seal support member 50 is formed smaller than an outside diameter D2 of the second seal support member 52. The second member 44 forms an intermediate part 44a (see FIG. 9) indented inside to have an outside diameter smaller than the outside diameter D1 of the first seal support member 50. Also, the inner space 42a of the first member 42 is formed so that the inside diameter of a tip side part 42b contacting the first seal member 46 is smaller than the inside diameter of a rear end side part 42c contacting the second seal member 48. The second member 44 is formed of resin. The second member 44 may be molded by casting.

Then, a method for forming a flow path crossing part 40 will be explained with reference to FIGS. 5 and 8.

First, the first member 42, the second member 44, the first seal member 46 and the second seal member 48 are prepared. Then, the first seal member 46 is mounted to the first seal support member 50 of the second member 44. Furthermore, the second seal member 48 is mounted to the second seal support member 52 of the second member 44.

Then, the second member 44 is inserted in the inner space 42a of the first member 42. At this time, a first seal support member 50 side (tip part side) of the second member 44 is inserted in advance. The inside diameter of a rear end side part 42c of the inner space 42a of the first member 42 is larger than that of the tip side part 42b. Therefore, it becomes difficult that the first seal member 46 unintentionally comes into contact with the rear end side part 42c for causing breakage or torsion and the first seal member 46 is broken or twisted. Furthermore, the outside diameter D1 of the first seal support member 50 is smaller than the outside diameter D2 of the second seal support member 52. Therefore, it becomes difficult that the first seal member 46 unintentionally comes into contact with the tip side part 42b for causing breakage or torsion and the first seal member 46 is broken or twisted.

Then, a second seal support member 52 side (rear end part side) of the second member 44 is inserted. The inside diameter of the rear end side part 42c of the inner space 42a is larger than that of the tip side part 42b. Therefore, it also becomes difficult that the second seal member 48 unintentionally comes into contact with the rear end side part 42c for causing breakage or torsion and the second seal member 48 is broken or twisted.

In this manner, the second member 44 is inserted in the first member 42, so that a flow path crossing part 40 at which two flow paths cross with each other can be formed reliably by a comparatively simple method. Also, when the flow path crossing part 40 is formed of resin, the increase of thickness by molding by casting can be prevented, and the thickness of the flow path crossing part 40 can be made small.

In this embodiment, as shown in FIG. 7, the flow path crossing part 40 is formed by arranging the second member 44 forming an inside flow path at a center portion inside the first member 42 forming the outflow path 14. As a variation example shown in FIG. 10, the flow path crossing part 40 is formed by arranging the second member 44 at a top part inside the first member 42 forming the outflow path 14. That is to say, in this positional relationship where the outflow path 14 and the flow path in the second member 44 cross with each other, but the second member 44 is not arranged at a center portion inside the first member 42. In this manner, the flow path crossing part 40 includes such arrangement that the first member 42 and the second member 44 partially cross with each other like a concave shape. For example, the flow path inside the second member 44 is formed at the top part of the flow path crossing part 40, and the outflow path 14 in the first member 42 is formed at the lower part of the flow path crossing part 40. The flow path inside the second member 44 is illustrated by the cold water supply pipe 6 in FIG. 10. On the contrary, for example, the flow path inside the second member 44 is formed at the lower part of the flow path crossing part 40, and the outflow path 14 in the first member 42 may be formed at the top part of the flow path crossing part 40.

Furthermore, as a variation example, the flow path crossing part 40 may be formed by a first member 42 formed so that a columnar inner space 42a is partially expanded to outside, and a second member 44 formed in a columnar shape. In this case, the outflow path 14 is formed in a space formed to be partially expanded to outside of the first member 42. The flow path inside the second member 44 is formed in the second member 44.

In the first embodiment according to the present invention as described above, in the faucet apparatus 1 arranged inside the counter provided along the wall surface, the outflow path 14 can cross with at least any of the cold water supply pipe 6 or the hot water supply pipe 8 arranged such a height that it crosses with the outflow path 14, while distinguishing the respective inner flow paths from each other. Thereby, a space in a height direction in the faucet apparatus 1 required for any of the outflow path 14, the cold water supply pipe 6 or the hot water supply pipe 8 to cross with each other while changing the height can be saved. Thus, according to the present invention, the faucet apparatus 1 arranged inside the counter provided along a wall surface W can be made thin in the height direction, and the counter can be made thin in the height direction.

Also, in the faucet apparatus 1 in the first embodiment of the present invention, the flow path crossing part 40 of the outflow path 14 is formed by inserting the second member forming the inside flow path distinguished from its own outside into the first member forming the outflow path 14. Thus, regarding the flow path crossing part 40 of the outflow path 14, the increase of the thickness by molding by casting can be prevented, and the flow path crossing part 40 is molded by resin, so as to make the thickness small. Therefore, according to the present invention, the faucet apparatus 1 arranged inside the counter can be made thin in the height direction. Also, the flow path crossing part 40 of the outflow path 14 can be formed of resin comparatively simply.

Furthermore, in the faucet apparatus 1 in the first embodiment of the present invention, the flow path crossing part 40 distinguishes the outflow path 14 by the first member 42 and the second member 44 between the first seal member 46 and the second seal member 48 for sealing the contact part of the first member 42 and the second member 44, and distinguishes it from the flow path in the second member 44. Thereby, the flow path crossing part 40 is formed by combination of the first member 42 and the second member 44 comparatively simply, and the outflow path 14 at the flow path crossing part 40 can cross with at least any of the cold water supply pipe 6 or the hot water supply pipe 8 arranged at such a height that it crosses with the outflow path 14, while distinguishing the respective inner flow paths from each other.

Furthermore, in the faucet apparatus 1 in the first embodiment of the present invention, the second member 44 is formed into a cylindrical shape at a portion for defining at least the outflow path 14 outside. Thereby, due to a temperature difference between the hot or cold water passing inside the second member 44 and the temperature-controlled water in the outflow path 14, when a stress is applied to the second member 44, the stress is applied to the second member 44 comparatively equally, and the breakage of the second member 44 can be restrained. In this manner, the second member 44 is formed into a cylindrical shape. Therefore the second member prevent causing a phenomenon that the stress is concentrated on the corner and the second member 44 is broken by forming the second member 44 into a deformed pipeline having a corner.

Furthermore, in the faucet apparatus 1 in the first embodiment of the present invention, the first seal support member 50 on a tip side of the second member 44 inserted in advance is formed so that its outside diameter is made smaller than that of the second seal support member 52 on a rear end side. Therefore, an assembling efficiency at the time of assembly at which the second member 44 is inserted accompanying with the first seal member 46 and the second seal member 48, can be improved.

Also, the first seal support member 50 supporting the first seal member 46 is formed so that its outside diameter is made smaller than that of the second seal support member 52. Thereby, when the first seal member 46 supported by the first seal support member 50 is inserted in the first member 42, it can be restrained that the first seal member 46 unintentionally comes into contact with the first member 42 for causing breakage or torsion, the first seal member 46 is broken or twisted, and the first seal member 46 is not provided at a proper state.

Furthermore, in the faucet apparatus 1 in the first embodiment of the present invention, the second member 44 is formed of resin with lower heat conductivity than metal, so that heat exchange between the hot or cold water passing inside the second member 44 and the temperature-controlled water in the outflow path 14 can be restrained. Also, the second member 44 is formed of resin, so the faucet apparatus can be manufactured at lower costs. Furthermore, the weight of the faucet apparatus can be made small, so as to improve workability and reduce transportation costs.

Furthermore, the faucet apparatus 1 in the first embodiment of the present invention, the flow path crossing part 40 is provided in a vicinity area of the water temperature control function unit 10 on an upper stream side than the flow rate control unit 16. Thereby, in an area where the outflow path 14 easily crosses with the other flow path, the outflow path 14 can cross at least any of the cold water supply pipe 6 or the hot water supply pipe 8 arranged at such a height that it crosses with the outflow path 14 while distinguishing the respective inner flow paths from each other, so as to improve arrangement efficiency of the flow path. Thereby, a space in the height direction in the faucet apparatus 1 required so that any of the outflow path 14, the cold water supply pipe 6 or the hot water supply pipe 8 can cross with each other while changing the height so as to bypass with each other, can be more efficiently saved. Thus, according to the present invention, the faucet apparatus 1 arranged inside the counter provided along the wall surface W can be made thinner in the height direction, and the counter can be made thinner in the height direction.

Then, the faucet apparatus in a second embodiment of the present invention will be explained with reference to FIGS. 12 to 14. The faucet apparatus in the second embodiment has almost the same structure as that of the faucet apparatus in the above-mentioned first embodiment. So, only points in the second embodiment of the present invention different from those in the first embodiment will be explained, the same numerals are provided to similar parts in the drawings, and its explanation is omitted.

Figure 12:
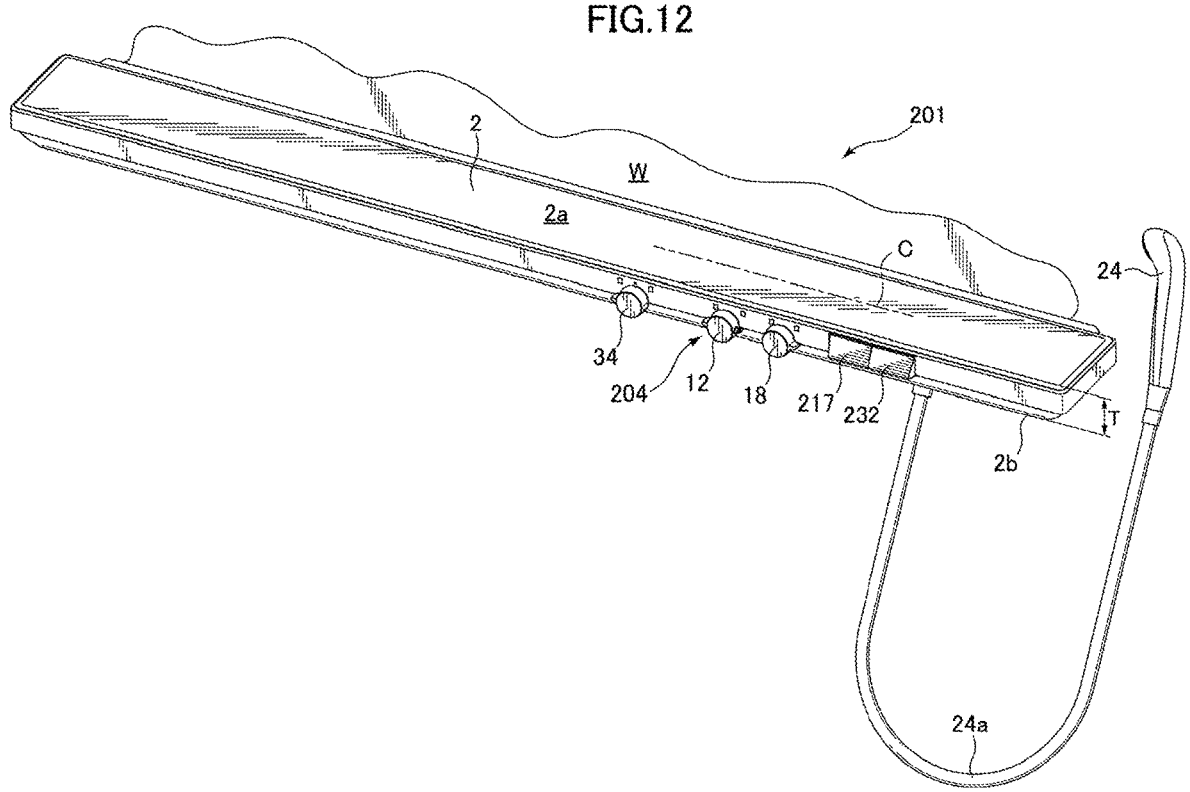
FIG. 12 is a perspective view of a faucet apparatus in a second embodiment of the present invention.

FIG. 12 is a perspective view of the faucet apparatus in the second embodiment of the present invention. FIG. 13 is a front view of a faucet apparatus main body of the faucet apparatus in the second embodiment of the present invention. FIG. 14 is a cross section view of the faucet apparatus seen along a line XIV-XIV of FIG. 13.

In the explanation in the second embodiment of the present invention as follow, a front side of a faucet apparatus 201 in a user side using the faucet apparatus 201 (a user side existing in front of the faucet apparatus 210 for using the faucet apparatus 201) is designated as a front side, a wall surface W side of the faucet apparatus 201 is designated as a rear side, a right side when the faucet apparatus 201 is seen from a front is designated as a right side, and a left side in a front is designated as a left side.

Figure 13:
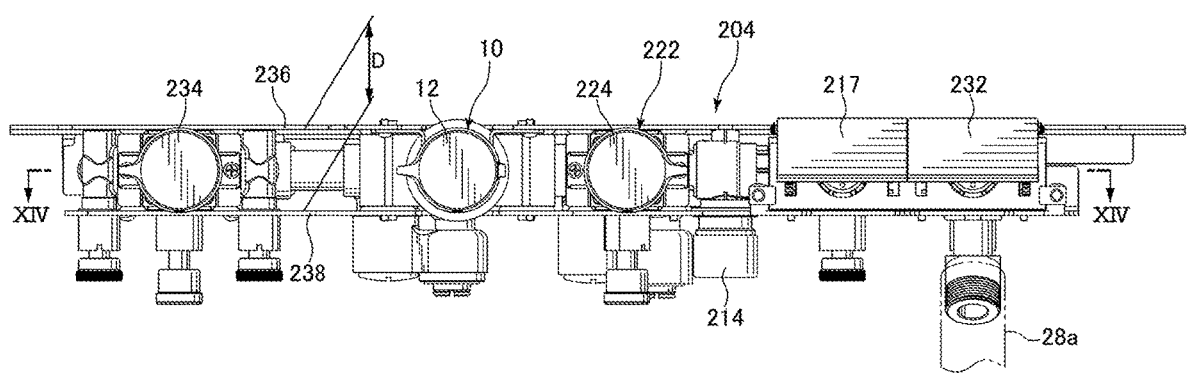
FIG. 13 is a front view of a faucet apparatus main body of the faucet apparatus in the second embodiment of the present invention.
Figure 14:
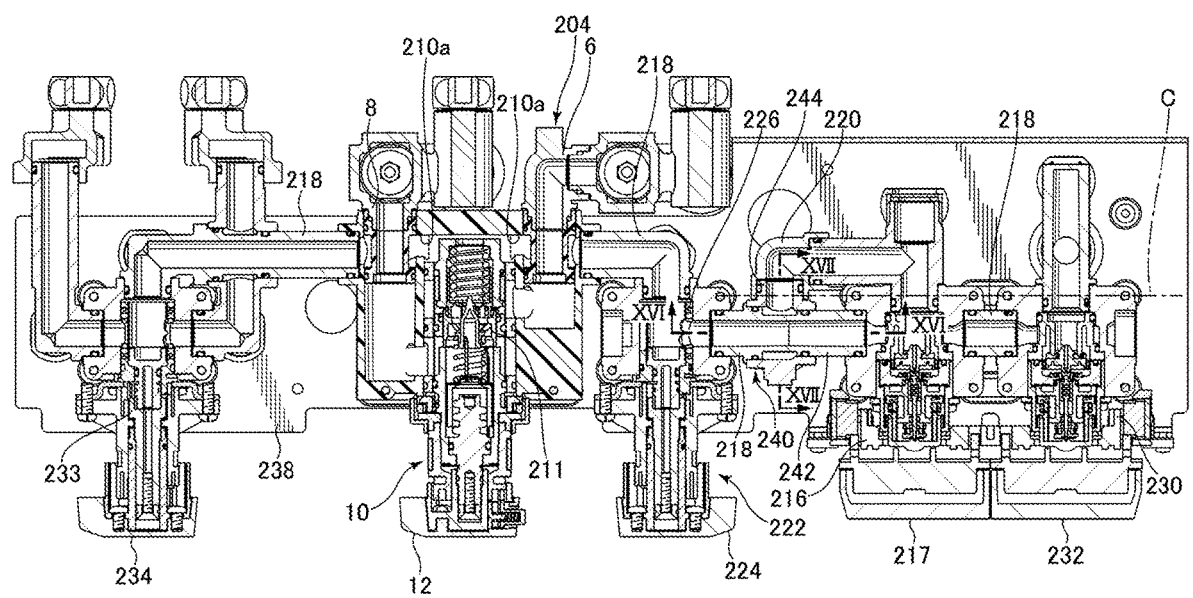
FIG. 14 is a cross section view of the faucet apparatus seen along a line XIV-XIV of FIG. 13.

As shown in FIGS. 13 and 14, a faucet apparatus main body 4 of the faucet apparatus 201 comprises a tap water spout part 214 that is a water spout part for spouting the temperature-controlled water being temperature-controlled water flowing from the water temperature control function unit 10, a water spout and stop control unit 216 for a tap that is a water spout and stop control unit having a function for switching the spout and stop of the temperature-controlled water from the tap water spout part 214, a touch operation unit 217 for a tap for performing an operation for switching the spout and stop of water by the water spout and stop control unit 216 for the tap, a first flow path 218 extending to at least the water spout and stop control unit 216 for the tap from the water temperature control function unit 10, a second flow path 220 extending to the tap water spout part 214 from the water spout and stop control unit 216 for the tap, a flow rate control unit 222 having a function for controlling a flow rate of the temperature-controlled water flowing through the first flow path 218, and a flow control handle 224 for performing a flow rate control operation by the flow rate control unit 222.

The water temperature control function unit 10 has a function for mixing the hot water supplied from the hot water supply pipe 8 and the cold water supplied from the cold water supply pipe 6 at a desired mixing proportion. The water temperature control function unit 10 flows the temperature-controlled water to the first flow path 218 from a flow outlet 210a. The water temperature control function unit 10 has a function for sliding a cylindrical water temperature control main valve body 211 arranged inside in an axial direction (forward and backward direction) and controlling a mixing proportion of the hot and cold water by user's operation of the water temperature control handle 12. The flow outlets 210a are formed on both right and left side faces of the water temperature control function unit 10, and respectively connected to the first flow path 218. The term "water" includes moderate temperature water. The water temperature control handle 12 is mounted to a front end of the water temperature control function unit 10. The water temperature control handle 12 has a structure capable of controlling the temperature of the temperature-controlled water by operation of the water temperature control handle 12 to rotate for sliding the water temperature control main valve body 211 of the water temperature control function unit 10 in the axial line direction.

The tap water spout part 214 forms a water spout port extending downward from a lower face of the faucet apparatus 201, and opened downward. The tap water spout part 214 spouts water toward a basin or a floor arranged below the faucet apparatus 201.

The water spout and stop control unit 216 for the tap is connected to the first flow path 218 on an upstream side, and to the second flow path 220 on a downstream side. The water spout and stop control unit 216 for the tap is configured to open and close the flow path from the first flow path 218 to the second flow path 220 by the operation of the touch operation unit 217 for the tap. Also, the water spout and stop control unit 216 for the tap may be formed to include the flow rate control unit 222 and the flow control handle 224.

The flow rate control unit 222 is arranged on an upper stream side than the water spout and stop control unit 216 for the tap and the water spout and stop control unit 230 for the shower on the first flow path 218. The flow rate control unit 222 has a function for controlling a flow rate of water supplied to a downstream side by user's operating the flow control handle 224 to rotate for rotating a rotation valve 226. The flow control handle 224 has a structure capable of operating a flow rate control of the flow rate control unit 222 by a rotating operation of the flow control handle 224 to rotate.

The faucet apparatus main body 204 further comprises the water spout and stop control unit 230 for the shower for switching the spout and stop of the temperature-controlled water from the showerhead 24, the touch operation unit 232 for the shower for performing an operation of switching the water spout and stop by the water spout and stop control unit 230 for the shower, a water spout and stop control unit 233 for an overhead shower for switching the spout and stop of the temperature-controlled water from an overhead shower (not shown), and an overhead shower operation unit 234 for switching the spout and stop of the water by the water spout and stop control unit 233 for the overhead shower.

The water spout and stop control unit 230 for the shower is connected to the first flow path 218 on an upstream side, and to a shower hose 24a on a downstream side. The water spout and stop control unit 230 for the shower is configured to open and close the flow path from the first flow path 218 to the shower hose 24a by operating the touch operation unit 232 for the shower.

The faucet apparatus main body 204 further comprises an upper plate 236 horizontally extending on an upper side of the water temperature control function unit 10, the first flow path 218, the second flow path 220, the flow rate control unit 222, the water spout and stop control unit 216 for the tap and the water spout and stop control unit 230 for the shower, and a lower plate 238 horizontally extending on a lower side of the water temperature control function unit 10, the first flow path 218, the second flow path 220, the flow rate control unit 222, the water spout and stop control unit 216 for the tap and the water spout and stop control unit 230 for the shower. The upper plate 236 and the lower plate 238 are formed of metallic plates. In the faucet apparatus main body 204, the respective function units are arranged to be sandwiched between the upper plate 236 and the lower plate 238. Therefore, by restraining the change (for example, height difference) of the flow path in the height direction of the first flow path 218 and the second flow path 220, an interval D between the upper plate 236 and the lower plate 238 (see FIG. 13) is reduced, so that the thickness T of the faucet apparatus main body 204 (see FIG. 12), for example, the thickness between the upper face 2a and the lower face 2b of the cover case 2 forming the counter can be made thin in the height direction.

The first flow path 218 extends to a below-described water spout and stop control unit 230 for a shower through the flow rate control unit 222 and the water spout and stop control unit 216 for the tap from the water temperature control function unit 10. Also, the first flow path 218 also extends to the water spout and stop control unit 233 for the overhead shower. The first flow path 218 is formed to almost horizontally from the flow outlet 210a of the water temperature control function unit 10 in a lateral direction. The first flow path 218 is formed at almost constant height, and is arranged at almost the same height between the upper plate 236 and the lower plate 238. The first flow path 218 is formed into an almost cylinder-shaped flow path at respective parts between the water temperature control function unit 10, the flow rate control unit 222, the water spout and stop control unit 216 for the tap and the water spout and stop control unit 230 for the shower.

The second flow path 220 almost horizontally extends to a below-described flow path crossing part 40 from the water spout and stop control unit 216 for the tap, is formed at almost constant height, and is arranged at almost the same height between the upper plate 236 and the lower plate 238. The second flow path 220 is formed into an almost cylinder-shaped flow path to a below-described flow path crossing part 40 from the water spout and stop control unit 216 for the tap. In this manner, the first flow path 218 and the second flow path 220 are arranged on a plane almost at the same height, and is arranged not to avoid and bypass each other three-dimensionally.

Then, the flow path crossing part will be explained with reference to FIGS. 15 to 17.

Figure 15:
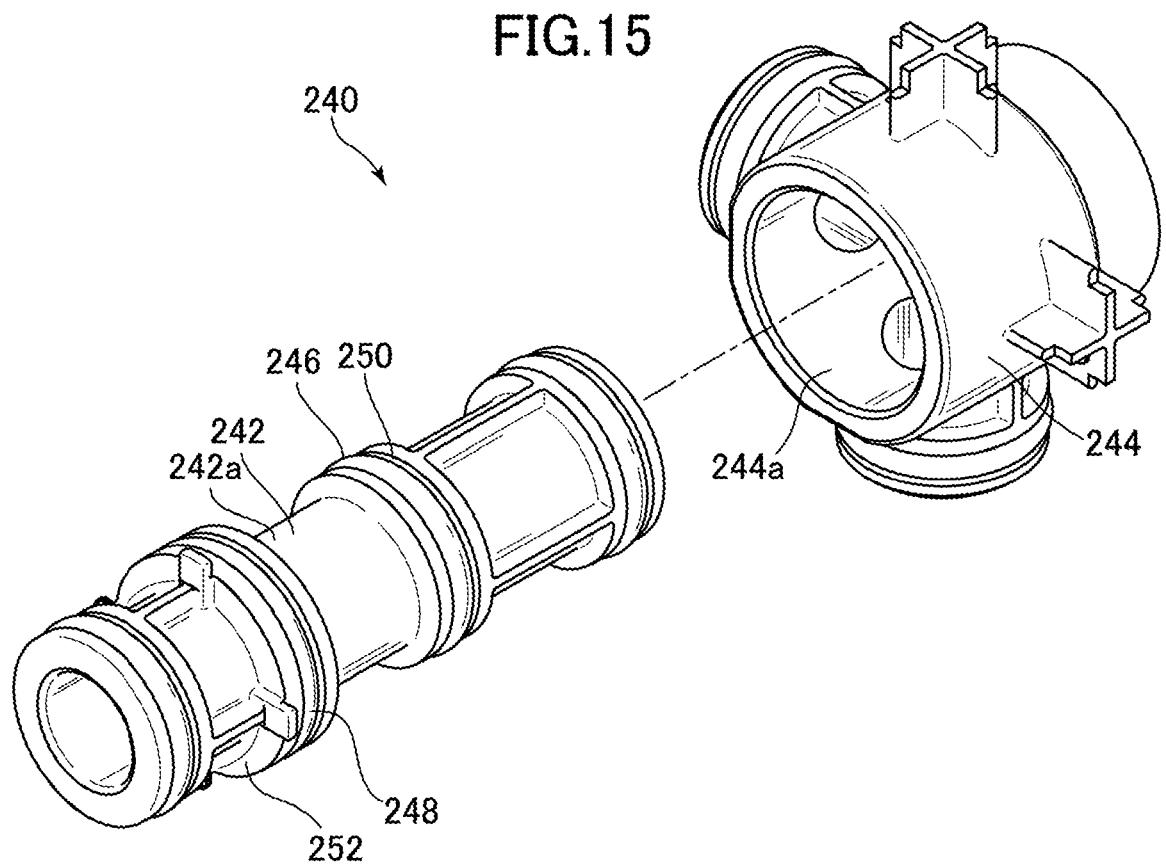
FIG. 15 is an exploded perspective view of the flow path crossing part of the faucet apparatus in the second embodiment of the present invention.
Figure 16:
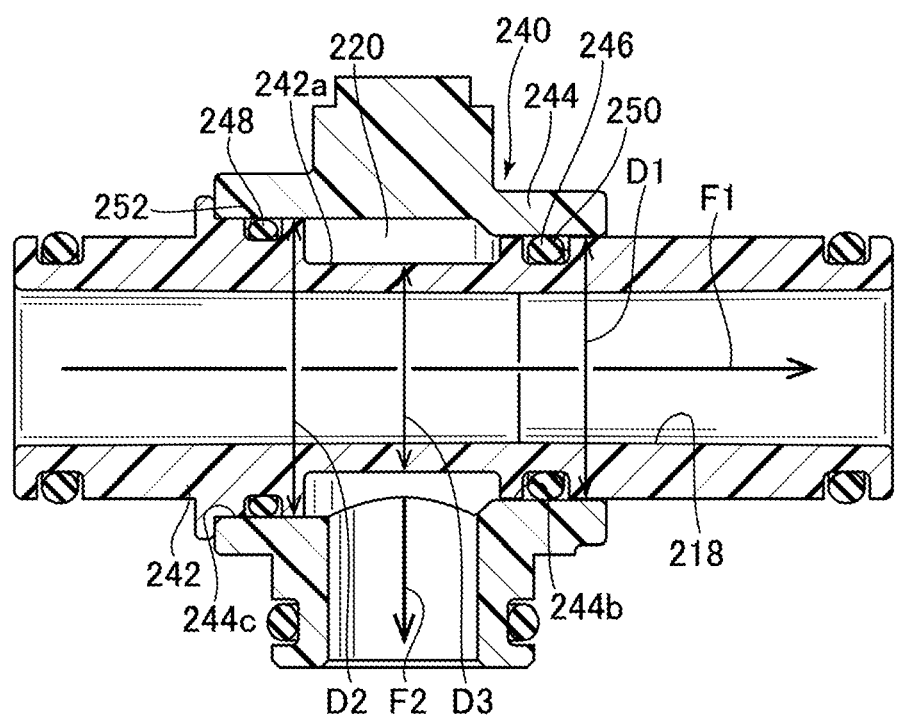
FIG. 16 is a cross section view in a right and left direction of the flow path crossing part seen along a line XVI-XVI of FIG. 14.

FIG. 15 is an exploded perspective view of the flow path crossing part of the faucet apparatus in the second embodiment of the present invention. FIG. 16 is a cross section view in a right and left direction of the flow path crossing part seen along a line XVI-XVI of FIG. 14. FIG. 17 is a cross section view in a forward and backward direction of the flow path crossing part seen along a line XVII-XVII of FIG. 14. In FIG. 16, the water flowing inside the first flow path 218 is indicated by an arrow F1, and the water flowing inside the second flow path 220 is indicated by an arrow F2.

The first flow path 218 and the second flow path 220 are arranged at almost the same height, and arranged at such a height that they cross with each other. The flow path crossing part 240, at which first flow path 218 and the second flow path 220 arranged at such a height that it cross with the first flow path 218 cross with each other while distinguishing their inner flow paths from each other is formed. Also, the first flow path 218 and the second flow path 220 may be arranged offset from each other in the height direction at a degree the respective center axes do not cross with each other and the ends of them cross with each other.

In the flow path crossing part 240, the first flow path 218 and the second flow path 220 can be efficiently arranged without bypassing the first flow path 218 and the second flow path 220 between the water temperature control function unit 10 and the water spout and stop control unit 216 for the tap, so as to further improve arrangement efficiency of the flow paths. The flow path crossing part 240 may be a flow path crossing part of the first flow path 218 and a flow path other than the second flow path 220.

The flow path crossing part 240 is formed by inserting the first member 242 forming the inside first flow path 218 distinguished from its own outside in the second member 244 forming the second flow path 220 inside. In this manner, the flow path crossing part 240 is formed while the first member 242 forming the inside first flow path 218 is arranged inside the second member 244, and the first flow path 218 is formed and defined inside the second flow path 220. The flow path crossing part 240 defines the second flow path 220 by the first member 242 and the second member 244 between the first seal member 246 and the second seal member 248 for sealing the contact part of the first member 242 and the second member 244, and distinguishes it from the first flow path 218 in the first member 242.

The first member 242 is a cylindrical member. The first member 242 is formed into a cylindrical shape at an intermediate part 242a for defining at least the second flow path 220 from outside. The first member 242 comprises a first seal support member 250 for supporting the first seal member 246 on a tip side inserted in the second member 244 in advance, and a second seal support member 252 for supporting the second seal member 248 on a rear end side inserted after inserting the first seal support member 250. The outside diameter D1 of the first seal support member 250 is formed smaller than the outside diameter D2 of the second seal support member 252. The intermediate part 242a is formed to be indented inside so as to have the outside diameter D3 smaller than the outside diameter D1 of the first seal support member 250. The first member 242 is formed of resin. Also, the first member 242 may be molded by casting.

The second member 244 forms a bent flow path member by forming the columnar second flow path 220 inside in a lateral direction and a downward direction respectively. Furthermore, the second member 244 is formed so that the columnar inner space 244a in which the first member 242 can be inserted crosses with the second flow path 220. The second member 244 is formed of resin. The second member 244 may be molded by casting. The second member 244 comprises a lateral flow path 220a extending in a lateral direction, an annular flow path 220b formed in an outside the intermediate part 242a of the first member 242 and an inside the second member 244, and a vertical flow path 220c extending downward. The flow path crossing part 240 forms a bent part of 90 degrees of the second flow path 220 bent to the vertical flow path 220c through the annular flow path 220b from the lateral flow path 220a of the second member 244.

As shown in FIG. 14, the flow path crossing part 240 is arranged between the water temperature control function unit 10 and the water spout and stop control unit 216 for the tap. Accordingly, in a thin counter, the tap water spout part 214 (see FIG. 13) can be arranged between the water temperature control function unit 10 and the water spout and stop control unit 216 for the tap in a top view. The water temperature control function unit 10 is provided at a center area of the faucet apparatus main body 204 to supply the temperature-controlled water to other control units and the like via the first flow path 218. The flow path crossing part 240 is provided, so that the tap water spout part 214 can be also provided in a center area of the faucet apparatus main body 204 or an area comparatively near the center area. Also, the flow path crossing part 240 is arranged in a further front side than a centerline C in a forward and backward direction of the upper face 2a of the cover case 2 in a top view (see FIGS. 12 and 14). Thus, in the thin counter, the tap water spout part 214 can be arranged in further front side than the centerline C in the top view.

Then, a method for forming a flow path crossing part 240 will be explained with reference to FIGS. 15 to 17.

First, the first member 242, the second member 244, the first seal member 246 and the second seal member 248 are prepared.

Then, the first seal member 246 is mounted to the first seal support member 250 of the first member 242. Furthermore, the second seal member 248 is mounted to the second seal support member 252 of the first member 242.

Then, the first member 242 is inserted in the inner space 244a of the second member 244. At this time, a first seal support member 250 side (tip part side) of the first member 242 is inserted in advance. The inside diameter of a rear end side part 244c of the inner space 244a of the second member 244 is larger than that of the tip side part 244b. Therefore, it can be restrained that the first seal member 246 unintentionally comes into contact with the rear end side part 244c for causing breakage or torsion and the first seal member 246 is broken or twisted. Furthermore, the outside diameter D1 of the first seal support member 250 is smaller than the outside diameter D2 of the second seal support member 252. Therefore, it can be restrained that the first seal member 246 unintentionally comes into contact with the tip side part 244b for causing breakage or torsion and the first seal member 246 is broken or twisted.

Then, a second seal support member 252 side (rear end part side) of the first member 242 is inserted. The inside diameter of the rear end side part 244c of the inner space 244a is larger than that of the tip side part 244b. Therefore, it also can be restrained that the second seal member 248 unintentionally comes into contact with the rear end side part 244c for causing breakage or torsion and the second seal member 248 is broken or twisted.

In this manner, the first member 242 is inserted in the second member 244, so that a flow path crossing part 240 at which two flow paths cross with each other can be formed reliably by a comparatively simple method. Also, when the flow path crossing part 240 is formed of resin, the increase of thickness by molding by casting can be prevented, and the thickness of the flow path crossing part 240 can be made thin.

Figure 17:
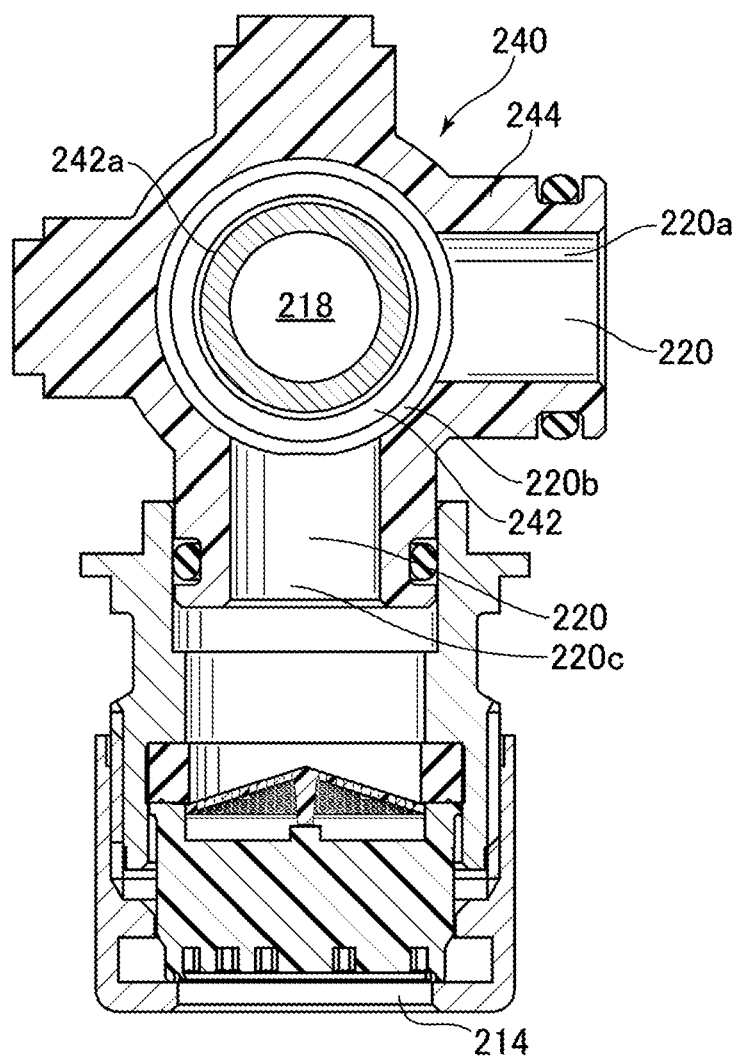
FIG. 17 is a cross section view in a forward and backward direction of the flow path crossing part seen along a line XVII-XVII of FIG. 14.
Figure 18:
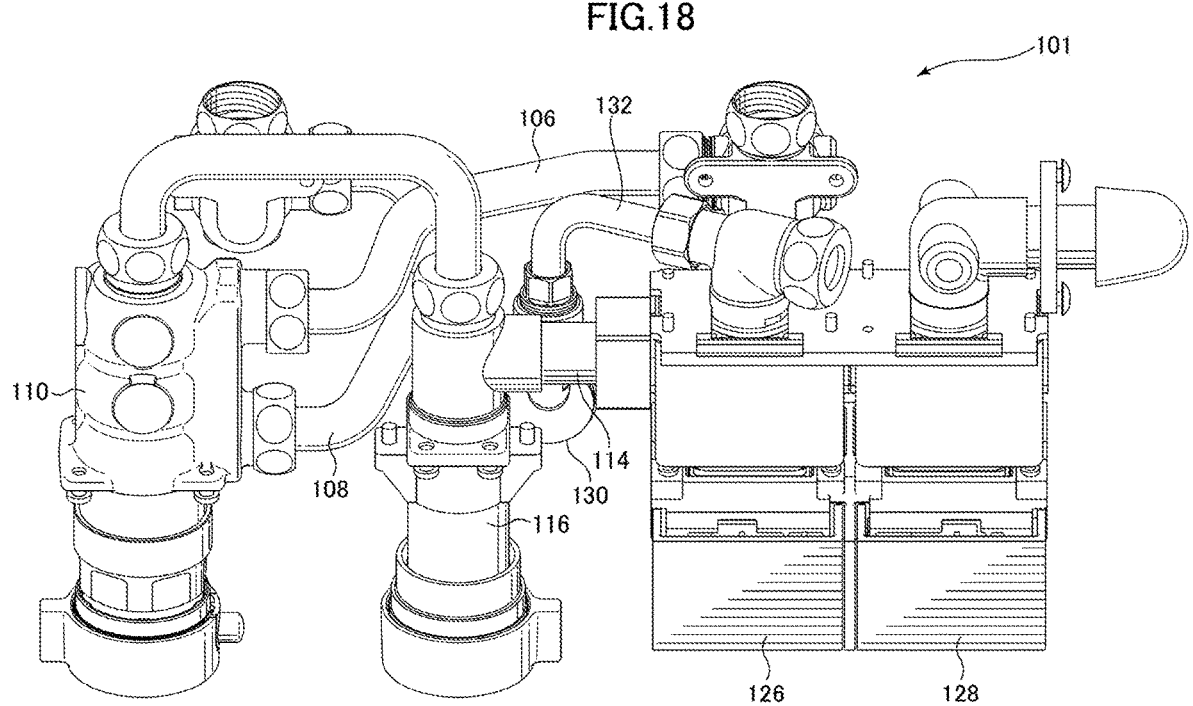
FIG. 18 is a perspective view illustrating arrangement of a cold water supply pipe, a hot water supply pipe and an outflow path of a conventional faucet apparatus.

In this embodiment, as shown in FIG. 17, the flow path crossing part 240 is formed by arranging the first member 242 almost at a center of the inner space 244a of the second member 244. As a variation example, the flow path crossing part 240 may be formed by arranging the first member 242 at a top part of the inner space 244a of the second member 244. The first flow path 218 inside the first member 242 is formed on an upper side of the flow path crossing part 240, and the second flow path 220 in the second member 244 is formed on a lower side of the flow path crossing part 240. For example, the flow path crossing part 240 includes arrangement forms such that one part is crossed in a manner that the first member 242 is arranged offset on the upper side of the second member 244 and the first member 242 passes through a concave-shaped part at the top part of the second member 244. On the contrary, for example, the first flow path 218 inside the first member 242 may be formed on the lower side of the flow path crossing part 240, and the second flow path 220 in the second member 244 may be formed on the upper side of the flow path crossing part 240.

In the faucet apparatus 201 in the second embodiment of the present invention as described above, at the flow path crossing part 240 of the faucet apparatus 201 arranged inside the counter provided along the wall surface W, the first flow path 218 and the second flow path 220 arranged at such a height that it cross with the first flow path 218 can cross with each other while distinguishing the respective inner flow paths from each other. Thereby, a space in the height direction in the faucet apparatus 201 required for achieving that the first flow path 218 and the second flow path 220 cross with each other while changing the height so as to bypass each other can be saved. Thus, according to the present invention, the faucet apparatus 201 arranged inside the counter provided along the wall surface W can be made thin in the height direction, and the counter can be made thin in the height direction.

Also, in the faucet apparatus 201 in the second embodiment of the present invention, the flow path crossing part 240 is formed by inserting the first member 242 forming the inside first flow path 218 distinguished from its own outside in the second member 244 forming the second flow path 220. Thus, the increase of the thickness by molding by casting can be prevented, and the flow path crossing part 240 is molded by resin, so as to make the thickness small. Therefore, according to the present invention, the faucet apparatus 201 arranged inside the counter can be made thin in the height direction. Also, the flow path crossing part 240 can be formed of resin comparatively simply.

Furthermore, in the faucet apparatus 201 in the second embodiment of the present invention, the flow path crossing part 240 defines the second flow path 220 by the first member 242 and the second member 244 between the first seal member 246 and the second seal member 248 for sealing the contact part of the first member 242 and the second member 244, and distinguishes it from the first flow path 218 in the first member 242. Thereby, the flow path crossing part 240 is formed by combination of the first member 242 and the second member 244 comparatively simply. At the flow path crossing part 240, the first flow path 218 can cross with the second flow path 220 arranged at such a height that it crosses with the first flow path 218, while distinguishing the respective inner flow paths from each other.

Furthermore, in the faucet apparatus 201 in the second embodiment of the present invention, the first seal support member 250 on a tip side of the first member 242 inserted in advance is formed so that its outside diameter is made smaller than that of the second seal support member on a rear end side. Therefore, an assembling efficiency at the time of assembly at which the first member 242 is inserted in the second member 244 accompanying with the first seal member 246 and the second seal member 248, can be improved. Also, the first seal support member 250 supporting the first seal member 246 is formed so that its outside diameter is made smaller than that of the second seal support member 252. Thereby, when the first seal member 246 supported by the first seal support member 250 is inserted in the second member 244, it can be restrained that the first seal member 246 unintentionally comes into contact with the second member 244 for causing breakage or torsion, the first seal member 246 is broken or twisted, and the first seal member 246 is not provided at a proper state.

Furthermore, in the faucet apparatus 201 in the second embodiment of the present invention, the first member 242 is formed into a cylindrical shape in at least a part distinguishing the second flow path 220 from outside. Thereby, due to a pressure difference between the temperature-controlled water of the first flow path 218 in the first member 242 and the temperature-controlled water of the second flow path 220 on a downstream side of the water spout and stop control unit 216 for the tap, even when a stress by water pressure is applied to the first member 242, a stress is applied to the first member 242 comparatively equally, so that breakage of the first member 242 can be restrained. In this manner, the first member 242 is formed into a cylindrical shape. Therefore causing a phenomenon can be prevented that the stress is concentrated at a corner and the first member 242 is broken, by forming the first member 242 into a deformed pipeline having a corner.

Furthermore, in the faucet apparatus 201 in the second embodiment of the present invention, the first member 242 is formed of resin, so the faucet apparatus 201 can be manufactured at lower costs.

Furthermore, in the faucet apparatus 201 in the second embodiment of the present invention, even when a crossing portion of the first flow path 218 and the second flow path 220 is broken at the flow path crossing part 240, the water flows to the water spout part via the second flow path 220 from the first flow path 218 that is a primary side flow path. Thus, when the crossing portion at the flow path crossing part 240 is broken, the water can flow from the water spout part as failure of water stop, so as to restrain the water from flowing out in the faucet apparatus 201 other than the second flow path 220 as leaked water.

Furthermore, in the faucet apparatus 201 in the second embodiment of the present invention, the flow path crossing part 240 can form the bent part of the second flow path 220, and therefore, a need for providing a curve pipeline for curving the flow path from the lateral direction toward the downward direction other than the flow path crossing part 240 can be eliminated. Thus, compared to a case where a pressure loss of an additional curve pipeline is received in addition to a pressure loss of water passing through the flow path crossing part 240, the second flow path 220 can be curved at the flow path crossing part 240 and it is possible to reduce the pressure loss of the second flow path 220.

Furthermore, in the faucet apparatus 201 in the second embodiment of the present invention, the flow path crossing part 240 is formed on the faucet apparatus 201, so that in a thin counter, the tap water spout part 214 can be arranged between the water temperature control function unit 10 and the water spout and stop control unit 216 for the tap in a top view. Thus, the tap water spout part 214 can be provided in a comparatively center area of the faucet apparatus 201 between the water temperature control function unit 10 and the water spout and stop control unit 216 for the tap, and a user can easily arrange a basin under the tap water spout part 214 while not interfering with structures such as right and left wall surfaces, a bath tab and the like, and it is possible to improve user's convenience of the tap water spout part 214.

Furthermore, in the faucet apparatus 201 in the second embodiment according to the present invention, the flow path crossing part 240 is formed on the faucet apparatus 201, so that in the thin counter, the tap water spout part 214 can be arranged in further front side than a centerline C on the top plate of the cover case 2 in a top view. Accordingly, the basin arranged under the tap water spout part 214 can be restrained from interfering with the wall surfaces W and the like on which the faucet apparatus 201 is provided, and the user can arrange the basin in further front side than the center of the top plate of the cover case 2, and it is possible to user's convenience of the tap water spout part 214.

DESCRIPTION OF REFERENCE NUMBERS 1 faucet apparatus
2 cover case
2a upper face
4 faucet apparatus main body
6 cold water supply pipe
8 hot water supply pipe
10 water temperature control function unit
14 outflow path
40 flow path crossing part
42 first member
44 second member
46 first seal member
48 second seal member
50 first seal support member
52 second seal support member
101 faucet apparatus
106 cold water supply pipe
108 hot water supply pipe
110 water temperature control function unit
114 first flow path
114 outflow path
132 second flow path
201 faucet apparatus
204 faucet apparatus main body
218 first flow path
220 second flow path
220a lateral flow path
220c vertical flow path
240 flow path crossing part
242 first member
244 second member
246 first seal member
248 second seal member
250 first seal support member
252 second seal support member

What is claimed is:

1. A faucet apparatus arranged inside a counter provided along a wall surface comprising
a cold water supply path for supplying cold water from a water supply source,
a hot water supply path for supplying hot water from a hot water supply source,
a water temperature control function unit connected to the cold water supply path and the hot water supply path, and capable of mixing hot water and cold water,
an flow path extending from the water temperature control function unit, wherein the flow path forms an outflow path for flowing temperature-controlled water from the water temperature control function unit, and the outflow path forms a first flow path crossing part crossing with the cold water supply path or the hot water supply path arranged at such a height that the supply path crosses with the outflow path while distinguishing respective inner flow paths from each other.

2. The faucet apparatus according to claim 1, wherein the first flow path crossing part is formed by inserting a second member forming an inside flow path distinguished from its own outside in a first member forming the outflow path.

3. The faucet apparatus according to claim 2, wherein the first flow path crossing part defines the outflow path by the first member and the second member between a first seal member and a second seal member for sealing a contact part of the first member and the second member, and is distinguished from the inside flow path in the second member.

4. The faucet apparatus according to claim 3, wherein the second member is formed into a cylindrical shape in at least a portion for defining at least the outflow path outside.

5. The faucet apparatus according to claim 4, wherein the second member comprises a first seal support member for supporting the first seal member on a tip side inserted in the first member in advance, and a second seal support member for supporting the second seal member on a rear end side inserted after inserting the first seal support member, and the first seal support member is formed so that its outside diameter is made smaller than the outside diameter of the second seal support member.

6. The faucet apparatus according to claim 2, wherein the second member is formed of resin.

7. The faucet apparatus according to claim 1, further comprising a flow rate control function unit for controlling a flow rate of temperature-controlled water on a downstream side of the water temperature control function unit, wherein the first flow path crossing part is provided on a further upper stream side than the flow rate control function unit.

8. The faucet apparatus according to claim 1, further comprising a water spout part for spouting temperature-controlled water from the temperature control function unit, and a water spout and stop control unit for switching spout and stop of the temperature-controlled water from the water spout part, wherein the flow path forms a first flow path extending from the water temperature control function unit to the water spout and stop control unit, the downstream side flow path on the downstream side of the flow path forms a second flow path extending from the water spout and stop control unit to the water spout part, and the first flow path and the second flow path arranged at such a height that the second flow path crosses with the first flow path form a second flow path crossing part which crosses the first flow path and the second flow path while distinguishing respective inner flow paths from each other.

9. The faucet apparatus according to claim 8, wherein the second flow path crossing part is formed by inserting a first member forming the inside first flow path distinguished from its own outside into a second member forming the second flow path.

10. The faucet apparatus according to claim 9, wherein the second flow path crossing part defines the second flow path by the first member and the second member between a first seal member and a second seal member for sealing a contact part between the first member and the second member, and distinguishes the second flow path from the first flow path in the first member.

11. The faucet apparatus according to claim 10, wherein the first member comprises a first seal support member for supporting the first seal member on a tip side inserted in the second member in advance, and a second seal support member for supporting the second seal member on a rear end side inserted after inserting the first seal support member, and the first seal support member is formed so that its outside diameter is made smaller than the outside diameter of the second seal support member.

12. The faucet apparatus according to claim 9, wherein the first member is formed into a cylindrical shape in at least a portion for defining the second flow path on its outside.

13. The faucet apparatus according to claim 9, wherein the first member is formed of resin.

14. The faucet apparatus according to claim 9, wherein the second flow path crossing part is formed by arranging the first flow path inside the second flow path.

15. The faucet apparatus according to claim 9, wherein the second member comprises a lateral flow path extending in a lateral direction, and a vertical flow path extending in a downward direction, and the second flow path crossing part forms a bent part of the second flow path bent from the lateral flow path of the second member to the vertical flow path.

16. The faucet apparatus according to claim 8, the water spout part is arranged between the water temperature control function unit and the water spout and stop control unit in a top view.

17. The faucet apparatus according to claim 8, further comprising a cover case formed on an upper face of the counter, wherein the water spout part is arranged in a further front side than a center portion of an upper face of the cover case in a top view.

* * * * *